(12) United States Patent  (10) Patent No.: US 8,393,984 B2
Naude  (45) Date of Patent: Mar. 12, 2013

(54) INFINITELY VARIABLE TRANSMISSION

(75) Inventor: Johannes Jacobus Naude, Randburg (ZA)

(73) Assignee: Varibox (PTY) Limited, Randburg (ZA)

( * ) Notice: Subject to any disclaimer, the term of this patent is extended or adjusted under 35 U.S.C. 154(b) by 796 days.

(21) Appl. No.: 12/495,977

(22) Filed: Jul. 1, 2009

(65) Prior Publication Data

US 2010/0062885 A1  Mar. 11, 2010

Related U.S. Application Data

(63) Continuation-in-part of application No. 10/504,992, filed as application No. PCT/ZA2004/000023 on Mar. 5, 2004, now Pat. No. 7,563,185.

(30) Foreign Application Priority Data

Oct. 13, 2003 (ZA) .................................. 2003/7933
Nov. 27, 2003 (ZA) .................................. 2003/9224
Aug. 25, 2006 (ZA) .................................. 2006/07143
Aug. 21, 2008 (ZA) .................................. 2008/07206

(51) Int. Cl.
*F16H 59/00* (2006.01)

(52) U.S. Cl. ............................................ 474/8; 474/49

(58) Field of Classification Search ................ 474/8–29, 474/49–51
See application file for complete search history.

(56) References Cited

U.S. PATENT DOCUMENTS

| 3,956,944 | A |   | 5/1976  | Tompkins |          |
|-----------|---|---|---------|----------|----------|
| 4,367,067 | A |   | 1/1983  | Chao     |          |
| 4,591,351 | A |   | 5/1986  | Kumm     |          |
| 4,618,331 | A |   | 10/1986 | Deal     |          |
| 4,787,879 | A |   | 11/1988 | Pritchard|          |
| 4,810,236 | A | * | 3/1989  | Kumm     | 474/101  |
| 4,832,660 | A |   | 5/1989  | Leonard  |          |
| 4,878,883 | A |   | 11/1989 | Wheless  |          |
| 4,929,218 | A |   | 5/1990  | Clough   |          |
| 4,938,732 | A | * | 7/1990  | Krude    | 474/53   |
| 5,049,113 | A | * | 9/1991  | Graham, Jr. | 474/49 |
| 5,406,863 | A |   | 4/1995  | Korge    |          |
| 5,984,814 | A |   | 11/1999 | Davenport|          |
| 7,563,185 | B2| * | 7/2009  | Naude    | 474/49   |

FOREIGN PATENT DOCUMENTS

| GB | 2062142  | 5/1981  |
|----|----------|---------|
| GB | 2135743  | 9/1984  |
| WO | 94/04411 | 3/1994  |
| WO | 00/11371 | 3/2000  |
| WO | 01/75333 | 10/2001 |
| WO | 03/042575| 5/2003  |
| WO | 03/078869| 9/2003  |

* cited by examiner

*Primary Examiner* — Michael Mansen
*Assistant Examiner* — Robert T Reese
(74) *Attorney, Agent, or Firm* — Young & Thompson

(57) ABSTRACT

An IVT machine includes an input shaft, a drive wheel on the input shaft, an output shaft, a ratio changing device which is mounted on the output shaft, an endless belt which passes over the drive wheel and in an open loop on the ratio changing device, control elements for enlarging and reducing the belt loop dimension about the output shaft axis, belt guide elements providing a throat through which the belt enters and leaves its loop on the ratio changing device, and a drive arrangement on the ratio changing device for the transmission of drive power to the output shaft and is engaged with the belt in a portion of its loop on the device and engageable with the belt on both sides of the throat in its transition across the throat during rotation of the ratio changing device.

4 Claims, 21 Drawing Sheets

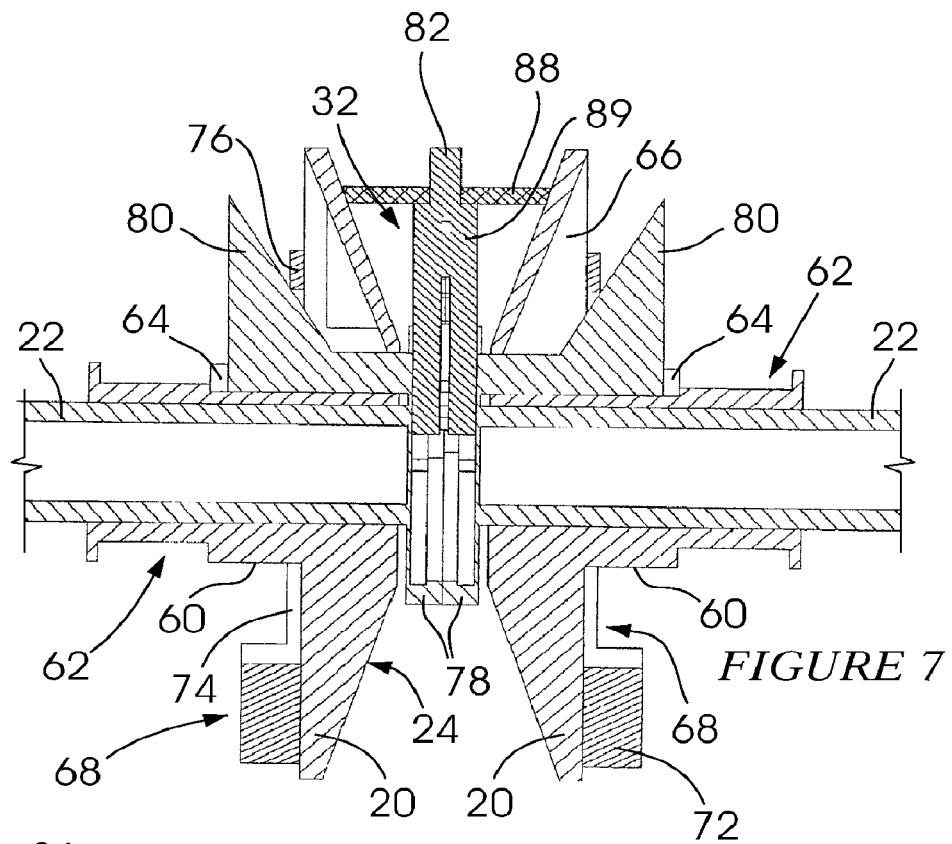
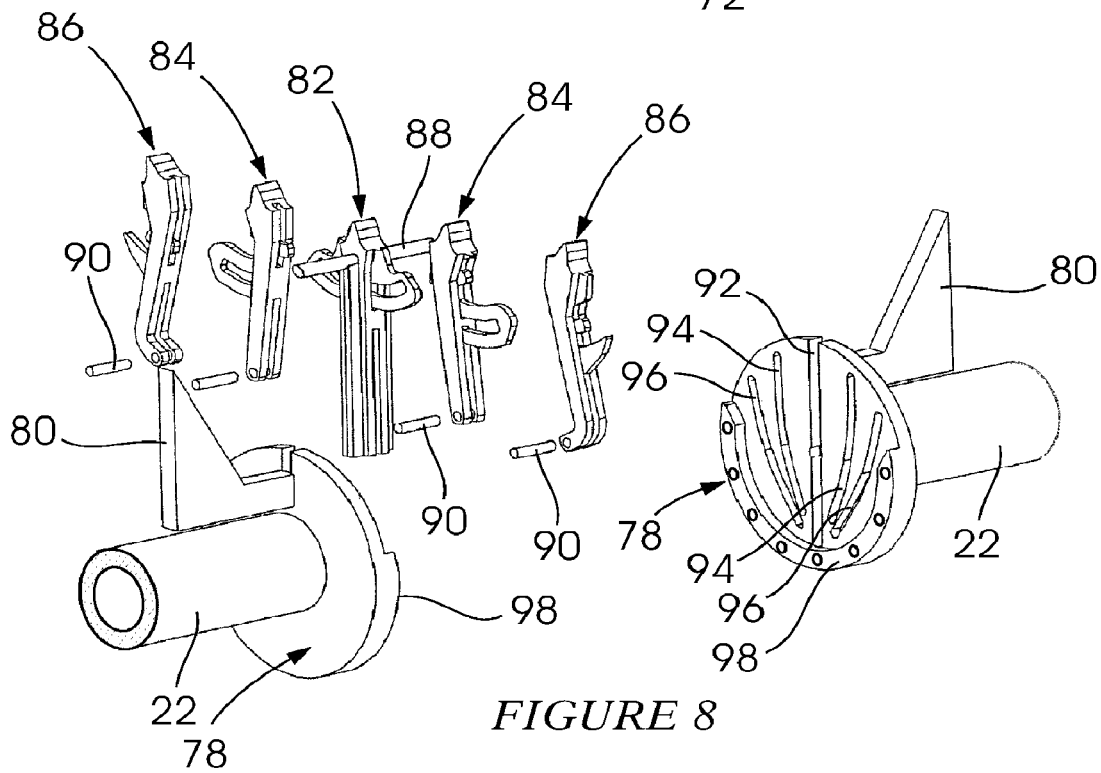

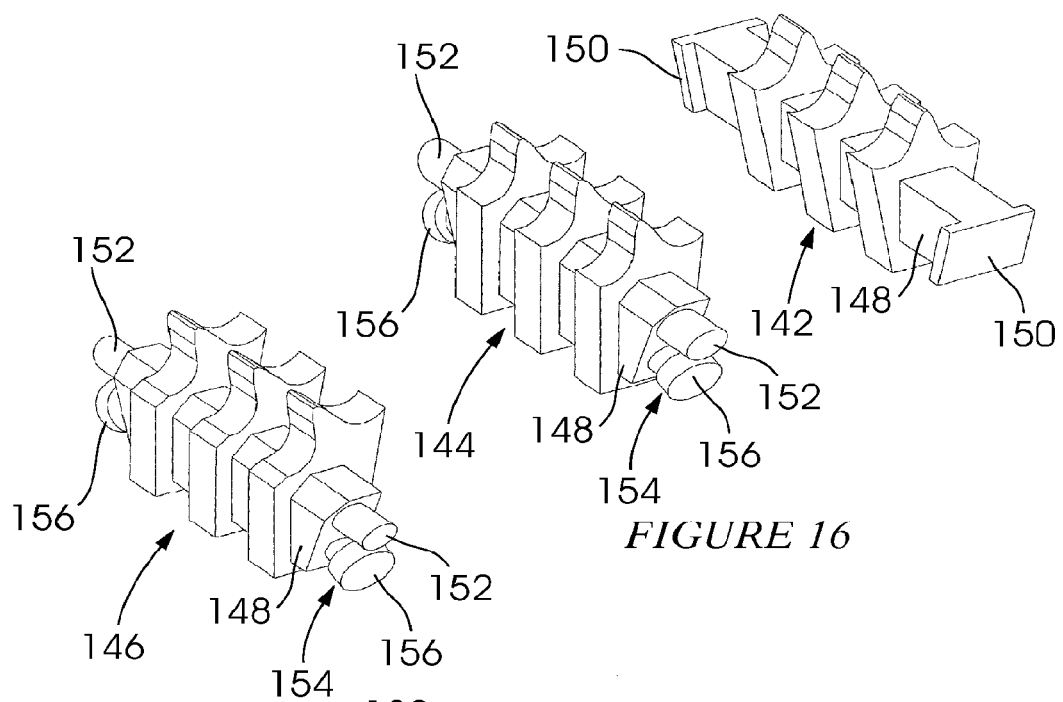
FIGURE 16
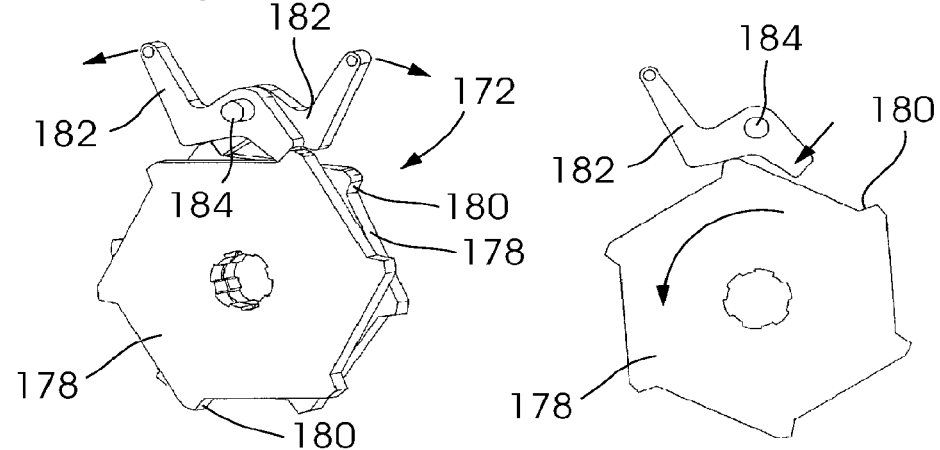
FIGURE 17
FIGURE 18

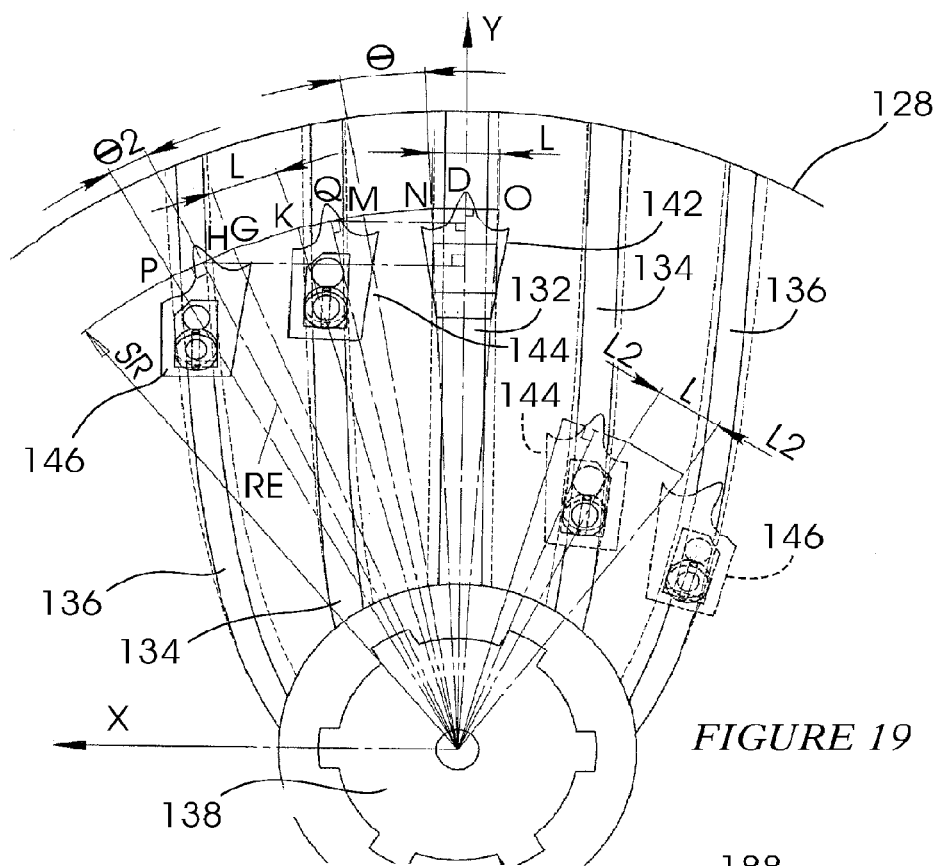
FIGURE 19
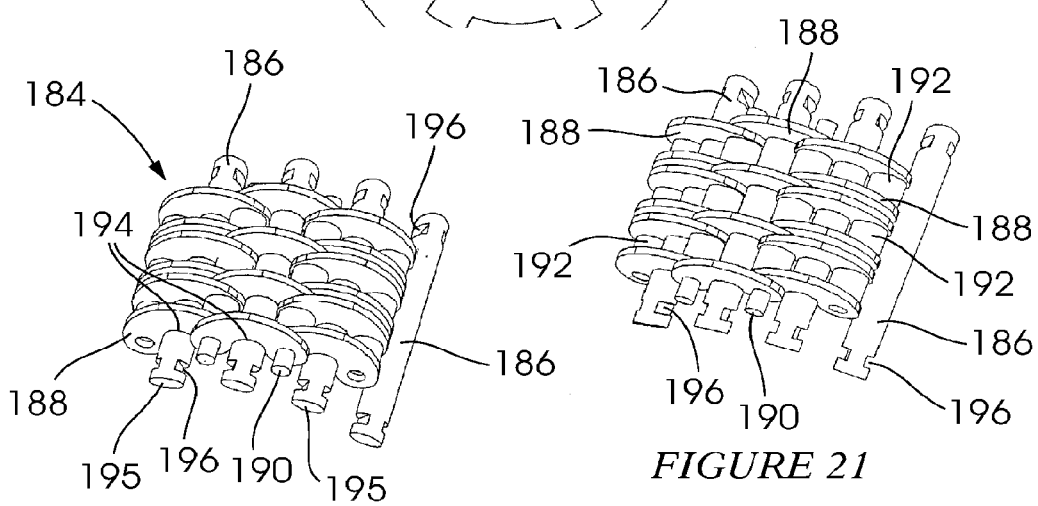
FIGURE 20
FIGURE 21

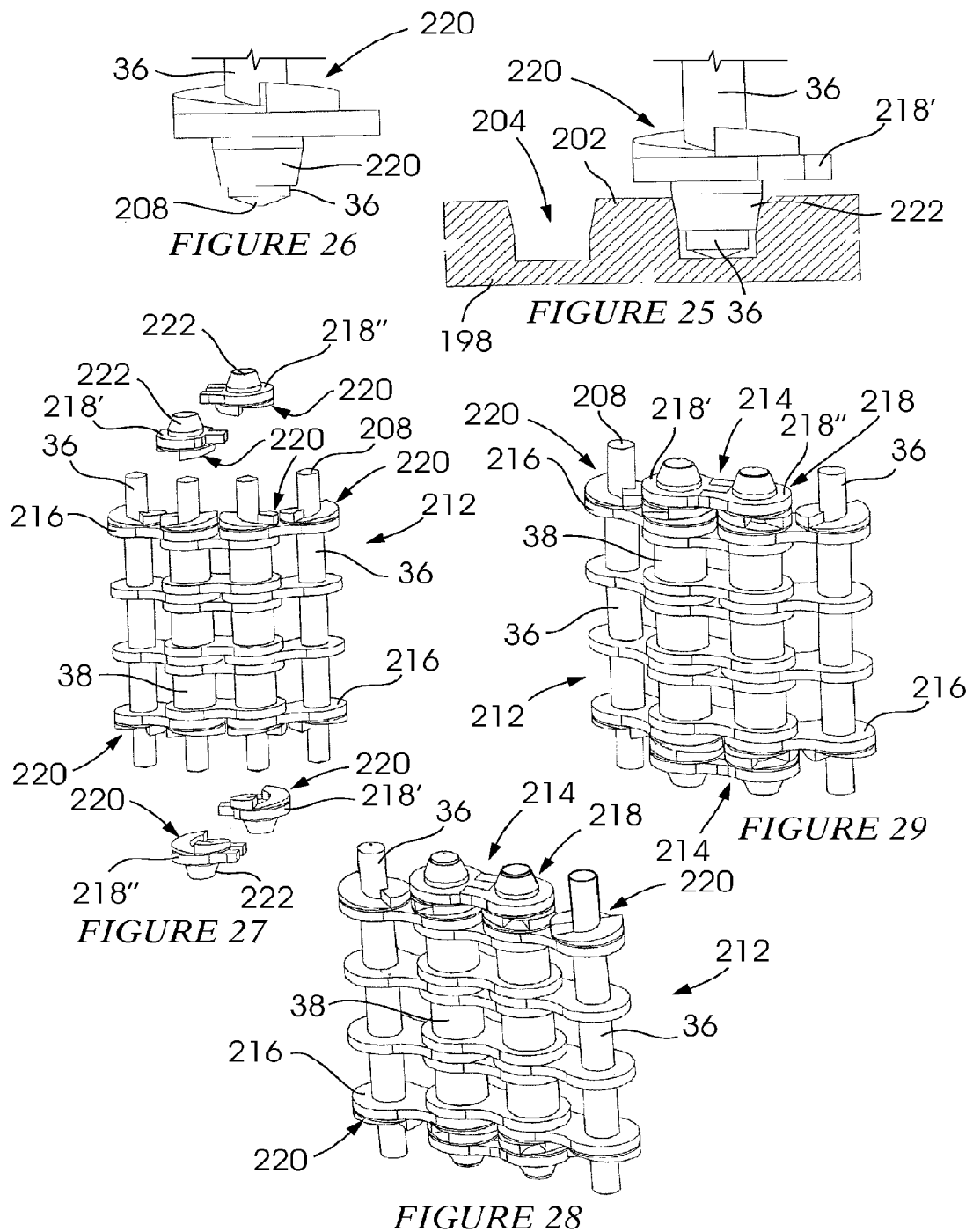

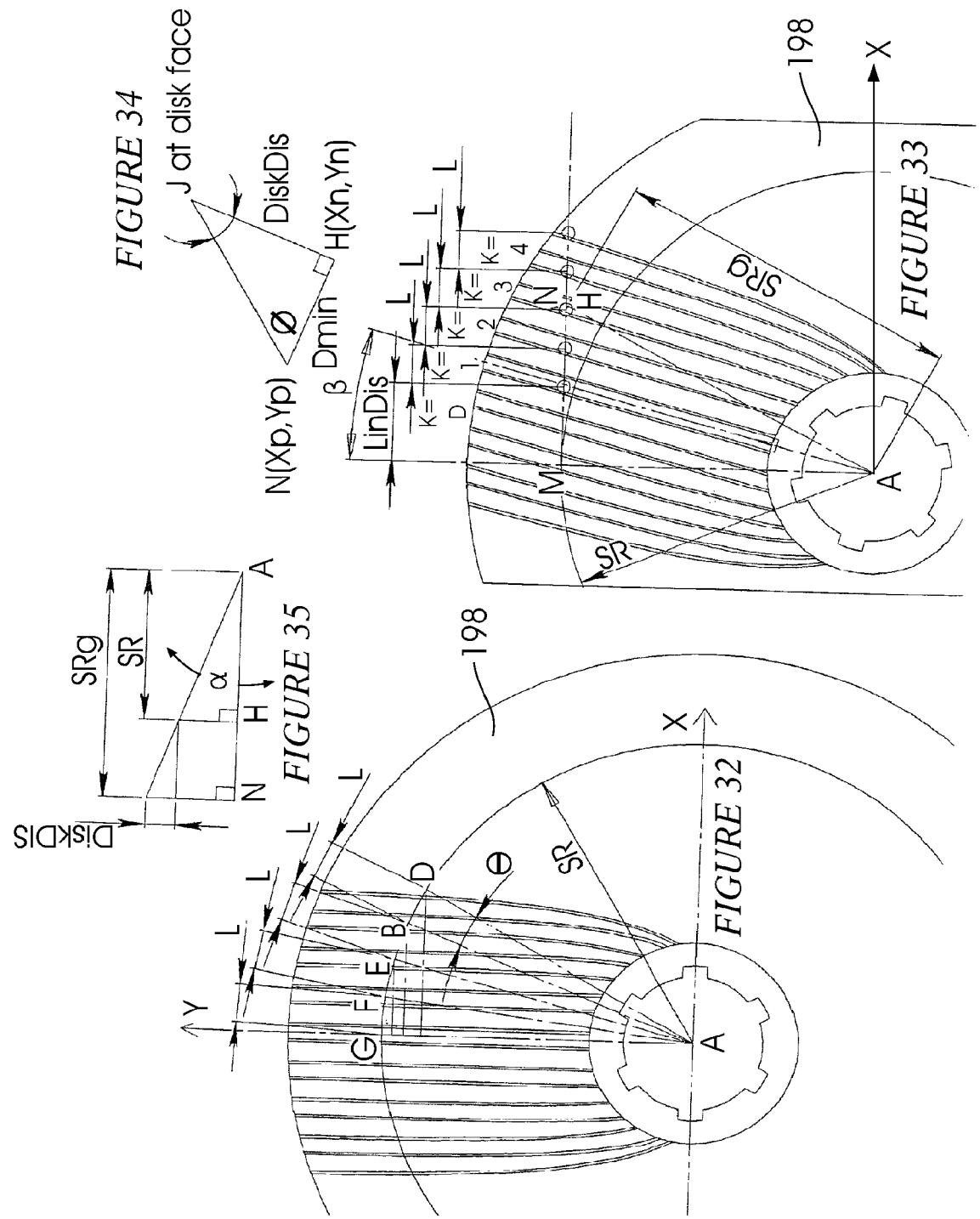

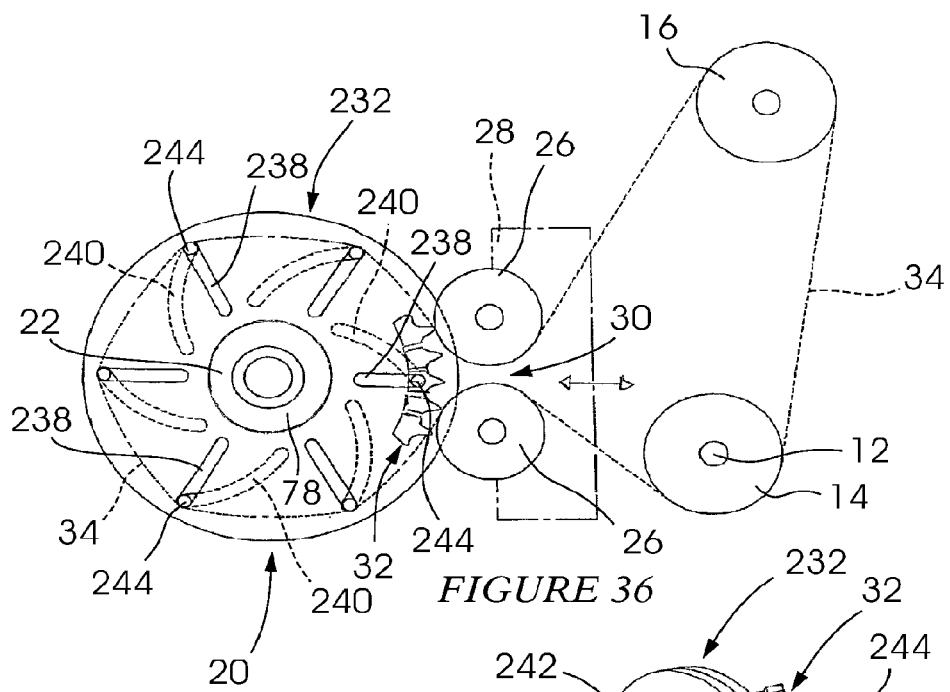
FIGURE 36
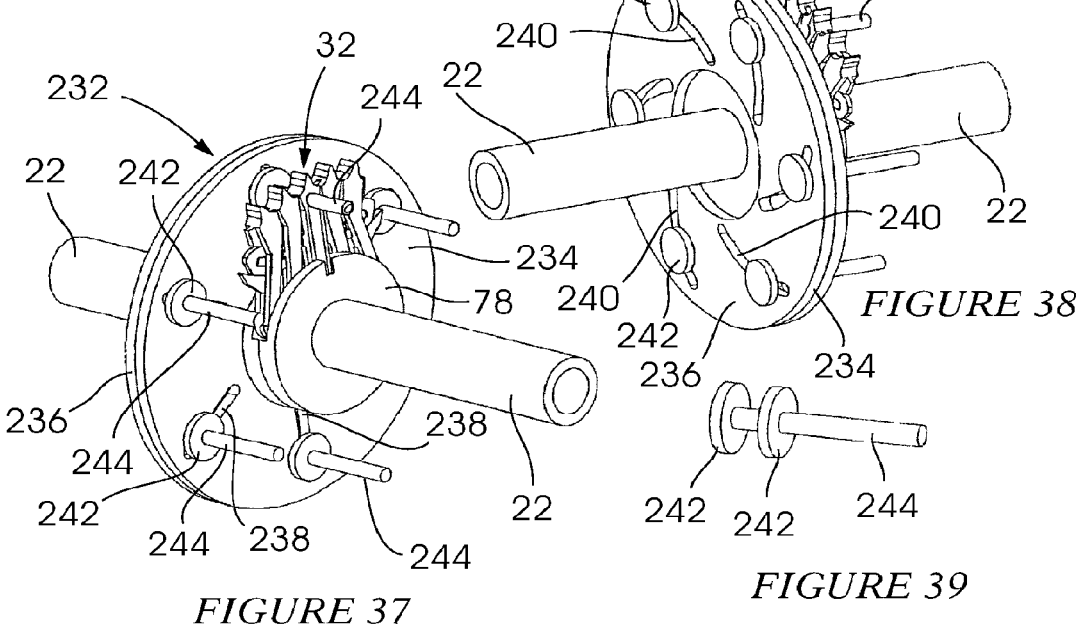
FIGURE 37
FIGURE 38
FIGURE 39

INFINITELY VARIABLE TRANSMISSION

CROSS REFERENCE TO RELATED APPLICATIONS

This application is a Continuation-in-Part of copending application Ser. No. 10/504,992 filed on Aug. 19, 2004 as the 35 U.S.C. 371 National Stage of international application PCT/ZA2004/000023 filed on Mar. 5, 2004, which claimed priority of South African application number 2003/7933 filed on Oct. 13, 2003 and South African application number 2003/9224 filed Nov. 27, 2003. This application also claims priority to South African Provisional application number 2008/07206 filed on Aug. 21, 2008. The entire contents of each of these applications are hereby incorporated by reference.

FIELD OF THE INVENTION

This invention relates to an incrementally operable IVT (infinitely variable transmission) machine which is intended for high power and high angular velocity operation and which is capable of power transmission in a reverse direction through it for engine braking.

BACKGROUND TO THE INVENTION

A significant body of prior art relating to IVT machines of the above type exists. Typical examples of these are described in the following publications: relating to bicycles—U.S. Pat. No. 4,878,883, GB2062142A, GB2135743A, U.S. Pat. Nos. 4,618,331, 3,956,944, 4,832,660, 5,984,814 and U.S. Pat. No. 4,787,879; relating to CVT/IVT—WO03/042575 and WO03/078869; relating to grooved/ribbed cone disc engagement—WO01/75333 and U.S. Pat. No. 4,367,067; relating to variable sprocket teeth ladder chain—WO94/04411 and U.S. Pat. No. 5,406,863.

It will be seen from the specifications of U.S. Pat. No. 4,878,883, GB2062142A, GB2135743A, U.S. Pat. Nos. 4,618,331, 3,956,944, 4,832,660, 5,984,814 and U.S. Pat. No. 4,787,879 that these machine consist largely of radially positionable engagement devices that operate, either by means of sprocket teeth or frictionally, within fixed tracks, which are spaced radially about a variable sprocket hub. Because of the limited number of engagement devices the flexible member track around them does not constitute a circular arc and their outputs are as a result, pulsed. Another problem with these prior art machines is the non-exact synchronisation of their engagement devices with drive chain links where engagement is accomplished via spring-loaded sprocket teeth or rotatable full sprockets operating in the fixed guides which make these devices suitable only for low speed applications, for example on bicycles. In high speed and high torque applications the above prior art machines are unsuitable.

In the cases of WO03/042575 and WO03/078869 the synchronisation problems have largely been solved, but they rely on sprag clutches which do not provide for power transmission in both directions (do not allow for engine braking).

In the cases of WO01/75333 and U.S. Pat. No. 4,367,067 the positive synchronised engagement of the chain with the disc grooves/ribs again presents a synchronisation problem.

In the cases of WO94/04411 and U.S. Pat. No. 5,406,863 positive engagement is accomplished but the storage of the ladder chain as well as its adjustment presents a problem in high speed applications.

The devices in most of the above publications sacrifice synchronised positive engagement for the ability to vary the ratio in infinitely small increments.

SUMMARY OF THE INVENTION

This invention provides an IVT machine comprising:
a first shaft,
a drive wheel which is rotatable with the first shaft,
an output shaft which is rotatable about an output axis,
a ratio changing device, having ratio changing formations, which is mounted coaxially on and rotatably with, the output shaft,
an endless belt which passes over the drive wheel and which has drive formations which are positively engaged with corresponding ratio changing formations at respective locations which are at a distance R from the output axis and which are angularly displaced from each other by a variable angle AD, relative to the output axis,
a control means for varying the distance R thereby to effect an incremental change, of defined magnitude, during one revolution of the output shaft, in the ratio of rotation of the input shaft to the rotation of the output shaft, and wherein $(AD) \times N = 360°$, where N is a variable integer.

The belt guide means may comprise two belt guide wheels which are located in close proximity to each other and which between them define a belt throat.

Alternatively the belt forms a throat, adjacent the ratio changing device, by means of a first belt portion which extends directly to the ratio changing device and an opposing second belt portion which passes over a belt guide wheel.

In one form of the invention the first shaft is an input drive shaft. In a different form of the invention the machine includes at least one belt guide wheel over which the belt passes to the ratio changing device, which is used to input drive to the belt.

The ratio changing device may include two frusto conical discs and the ratio changing formations may comprise slots in opposed faces of the discs.

The drive formations may include drive bar units, movably engaged with respective slots, and driver plates which are linked to the drive bar units and which, at all times, are positively engaged with the belt in a synchronised manner.

Preferably the belt is a rocker pin chain and includes chain pins, interconnected by chain links, which are positively engaged with the respective driver plates in a synchronised manner thereby to drive the drive plates. Use of a rocker pin chain is desirable because of its "silent" action.

Each driver plate may include a respective hole which is engaged with a respective drive bar unit and which is shaped to allow for a variation in pitch in the drive bar unit, during a ratio change, and to maintain the driver plate at a constant pitch for positive synchronised engagement with the belt.

In this specification, including its claims, the meaning of the word "belt" is to be taken to be as defined in The American Heritage Dictionary of the English language as "A continuous band or chain for transferring motion or power from one wheel or shaft to another".

BRIEF DESCRIPTION OF THE DRAWINGS

Embodiments of the IVT machine of the invention are now described by way of non-limiting examples only with reference to the accompanying drawings in which:

FIG. 7 is a sectional front elevation of the ratio changing arrangement of the FIG. 3 machine, FIG. 8 is an exploded isometric view of the drive arrangement of the FIG. 3 machine, FIG. 16 is an exploded isometric view of three of the five tooth carriers as used in the drive arrangement of the FIG. 13 machine, FIGS. 17 and 18 are substantially front elevations of the indexing trigger arrangement of the FIG. 13 machine, FIG. 19 is a fragmentary front elevation of the disc and drive arrangement of the FIG. 13 machine, FIGS. 20 and 21 are fragmentary isometric view of a variation of a chain for use with the machine of FIG. 13 and perhaps others, FIGS. 25 and 26 are front elevations of a chain fragment for use with a variation of the FIG. 22 machine, FIGS. 27 to 29 are isometric views of a short length of chain for use with the groove variation of the FIG. 22 machine as shown in FIG. 25, FIGS. 30 and 31 are isometric views of yet further variations of the ratio changing discs of the machine of FIG. 22 for use with a drive band in place of a chain, FIGS. 32 and 33 are fragmentary front elevations of the drive arrangement grooves of the FIG. 22 ratio changing discs used in the explanation of a mathematical model, FIGS. 34 and 35 are diagrams used in the FIGS. 32 and 33 mathematical model, FIG. 36 is a diagrammatic side elevation of a fourth embodiment of the IVT machine of the invention, FIGS. 37 to 39 are isometric views of the components of the ratio changing arrangement of the FIG. 36 machine.

DETAILED DESCRIPTION OF THE ILLUSTRATED EMBODIMENTS

Figure 1:
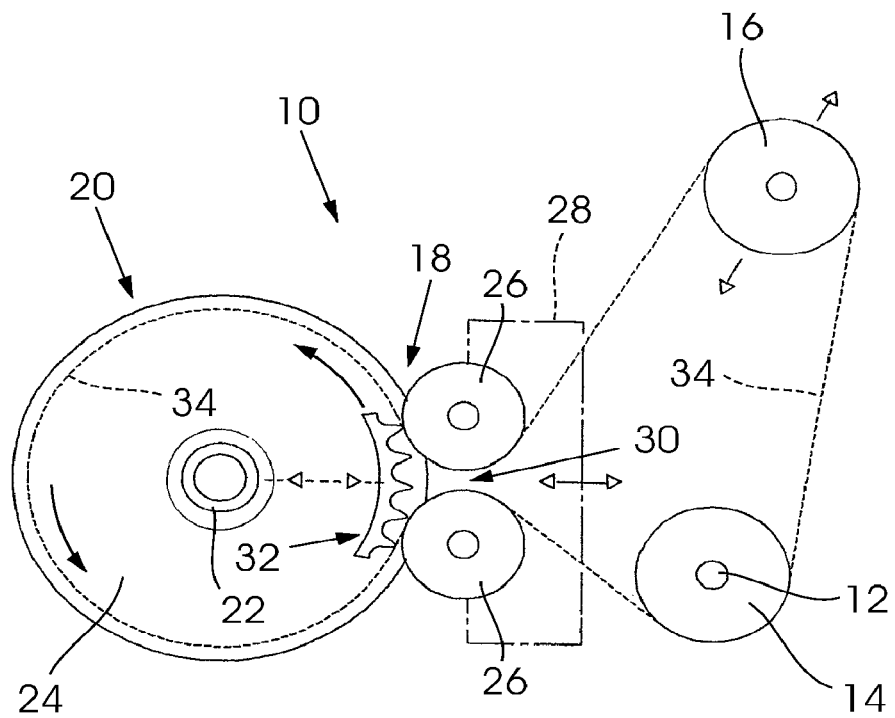
FIG. 1 is a diagrammatic side elevation of a basic IVT machine of the invention.
Figure 2:
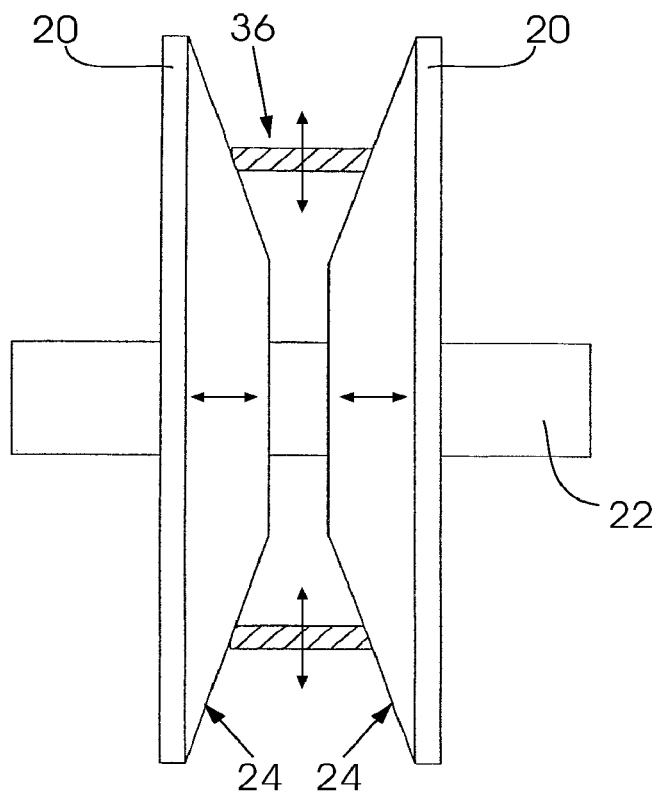
FIG. 2 is a front elevation of two ratio changing discs of the FIG. 1 machine.

The generic incremental IVT machine 10 of this invention is shown diagrammatically in FIGS. 1 and 2 to include a driven input shaft 12 which carries a fixed drive sprocket 14, an idler tension sprocket 16 which is adapted for movement in the direction of the arrows in FIG. 1 by control or against or by biasing means, not shown, and a ratio varying arrangement indicated generally at 18.

The ratio varying arrangement 18 includes a pair of ratio changing discs 20 which are fixed for rotation to and with the machine output shaft 22. The discs 20, as shown in FIG. 2, have facing frusto conical faces 24 and are movable, as will be explained below, towards and away from each other on the output shaft 22, as indicated by the arrows in the drawing. The discs 20 are, however, not common to all embodiments of the machine of this invention and, as will be seen from the final embodiment of the machine described in this specification, could be replaced by discs which do not include tapered faces but perform the same function as the discs 20.

The arrangement 18 additionally includes two idler sprockets 26 which are rotatably mounted in a fixed spatial relationship in close proximity to each other in a control frame element 28 in the machine frame which is not shown in the drawing. The idler sprockets 26 between them define a chain throat 30.

The control frame element 28 is movable, by any suitable control means such as a suitable lead screw or hydraulic actuator arrangement, in the direction of the arrows in FIG. 1 towards and away from the machine output shaft 22 which is journaled for rotation at a fixed position in the machine frame, and simultaneously to cause the ratio changing discs 20 to be moved towards and away from each other, as required, on the shaft 22. The frame element 28 is moved in both directions in small incremental steps, the purpose of which is explained below.

The ratio varying arrangement 18 further includes a partial sprocket drive arrangement 32 the teeth of which are movable individually or in groups relatively to each other. The drive arrangement 32 is mechanically coupled to the machine output shaft 22 or directly to the tapered faces 24 of the ratio changing discs 20, as will be described in more detail below, for the transmission of drive power to the output shaft 22.

The various rotating components of the machine 10 are interconnected to each other by an endless belt, which in this example is a drive chain 34 as shown by the dotted line in FIG. 1. The chain is shown on the disc 20 in FIG. 2 to be between the low and high ratio positions of the machine.

An important feature of the invention is that the distance by which the idler sprockets 26 are separated from each other in the throat 30 must always be less, and preferably substantially so, than the diameter of the almost circular chain 34 track between the ratio changing discs 20 with respect to the output shaft 22 axis, in all operational positions between and including the machine low and high ratio positions.

Broadly, the operation of the FIG. 1 IVT machine 10 is as follows: any suitable prime mover, not shown, is coupled to the input shaft 12 and its drive sprocket 14. The tension sprocket 16 holds the chain 34 in tension against the portion of the chain 34 which is wedged by the tapered ends of its link pins 36, which are shown exaggerated in FIG. 2, against the sloping faces 24 of the discs 20 to counteract uncontrolled radially inward movement of the chain towards the high ratio position of the transmission machine. The teeth of the partial sprocket drive arrangement 32 are engaged between adjacent link pins 36 of the chain 34 at any position in the circumference of the chain between the discs 20 which drive the output shaft 22.

With all of the IVT machine components in the positions shown in FIG. 1 the prime mover is activated to cause the chain 34 to run on the path illustrated in FIG. 1. In so doing the machine output shaft 22 is driven by the drive arrangement 32 through its mechanical coupling with either the output shaft 22 or directly with the discs 20.

To ensure uninterrupted rotation of the discs 20 and the output shaft 22 it is important that the drive arrangement 32 traverses the throat 30 as it is rotated by the chain without any interruption of its circular chain driven motion. To enable this to be done it is necessary that the teeth of the drive arrangement 32 are, in its path across the throat, perfectly engaged with the chain 34 on both sides of the throat 30 before releasing the bight of the chain leaving the throat to ensure continuity of drive force from the chain to the machine output shaft 22 during a complete 360° revolution of the drive arrangement. This throat transition of the drive arrangement must occur in all ratio positions of the chain 34 between the discs 20.

To avoid interference of the chain 34 with whatever drive arrangement 32 is employed by the machine it is important that whatever controls the machine will prevent any ratio changing while the drive arrangement is in the throat 30 zone of the chain circle between the discs 20.

To vary the drive ratio between the input and output shafts of the machine from the FIG. 1 low ratio position of the chain 34, the control frame element 28 is moved to the left in the drawing relatively to the machine frame by whatever control means is employed to do so. As the frame element 28 is moved so too are the idler sprockets 26 which it carries. The discs 20 are simultaneously caused by whatever controls them, in this example a forwardly projecting portion of the frame element 28, to move away from each other on the output shaft 22. The outward movement of the discs 20 enables the chain link pins 36 and so the chain together with the drive arrangement 32 to be moved between them towards the output shaft with the disc movement causing the chain track between the discs to be reduced in diameter to vary the machine input/output ratio. The chain tension sprocket 16 is simultaneously moved upwardly from its FIG. 1 position by its control means or bias to maintain tension on the chain during any ratio change of the machine. To again reduce the machine ratio the control frame element 28 is moved to the right in FIG. 1 with the directional changes of motion of its components described above being concomitantly reversed.

The practical first embodiment of the machine of FIG. 1 is now described in detail with reference to FIGS. 3 to 12.

Figure 3:
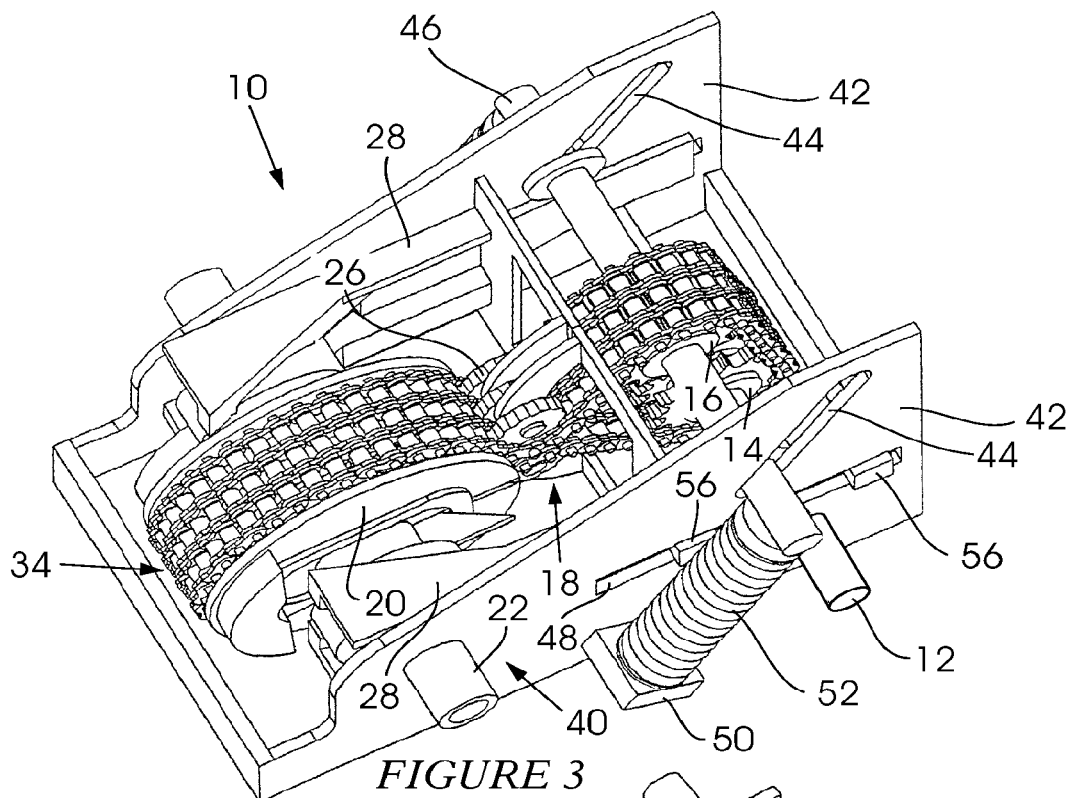
FIG. 3 is an isometric view from above of a practical embodiment of the FIG. 1 machine as shown in its low ratio position of operation.
Figure 4:
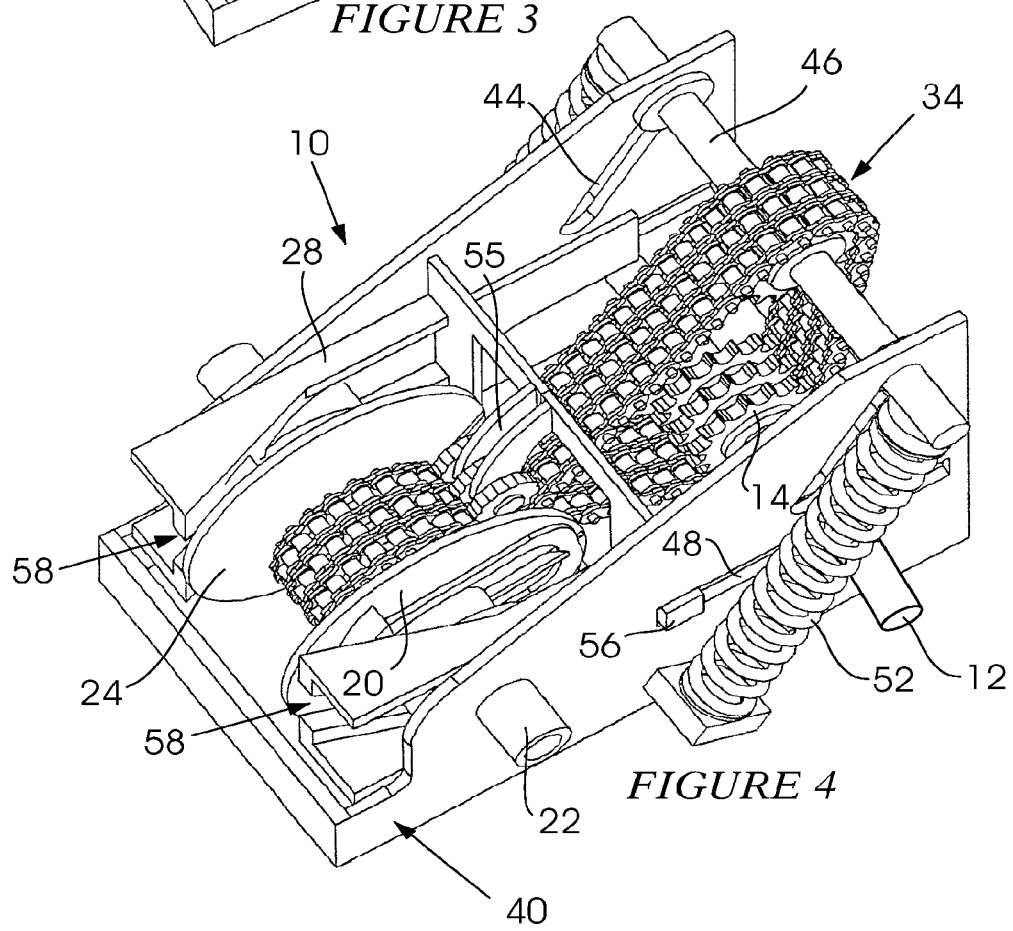
FIG. 4 is the same view as that of FIG. 3 showing the machine in its high ratio position of operation.

FIGS. 3 and 4 illustrate the FIG. 1 machine 10 in its low and high ratio positions respectively. In these two drawings the same reference numbers are used as are those in FIG. 1 for the same FIG. 1 machine components.

Figure 5:
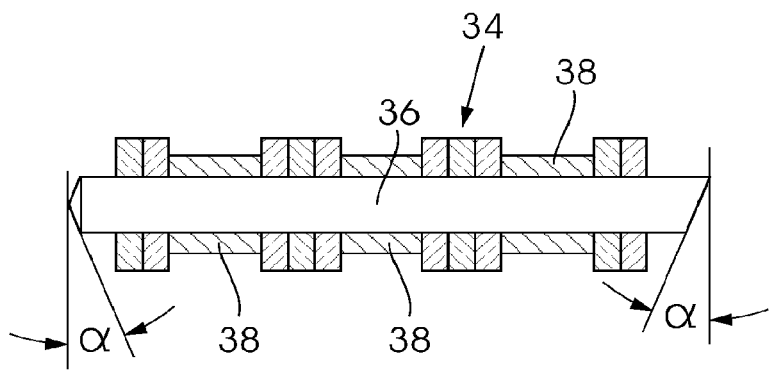
FIG. 5 is a sectioned front elevation of the chain of the FIG. 3 machine.

The chain 34 is a triple chain with the links of the chains located on common link pins 36 as shown in FIG. 5. The chain links are spaced from each other by rollers 38 on the link pins 36, as shown in FIG. 5. The projecting ends of the link pins 36 are either flattened or coned, with the alternatives shown in FIG. 5, at an angle a which corresponds to the angle of taper of the disc 20 faces 24. The tapered pin ends hold the chain wedged against the disc faces at its selected ratio position between the discs against radially inward movement towards the machine output shaft 22. The chain results in triple drive sprockets 14, tension sprockets 16 and the throat defining idler sprockets 26, as shown in FIGS. 3 and 4.

Figure 11:
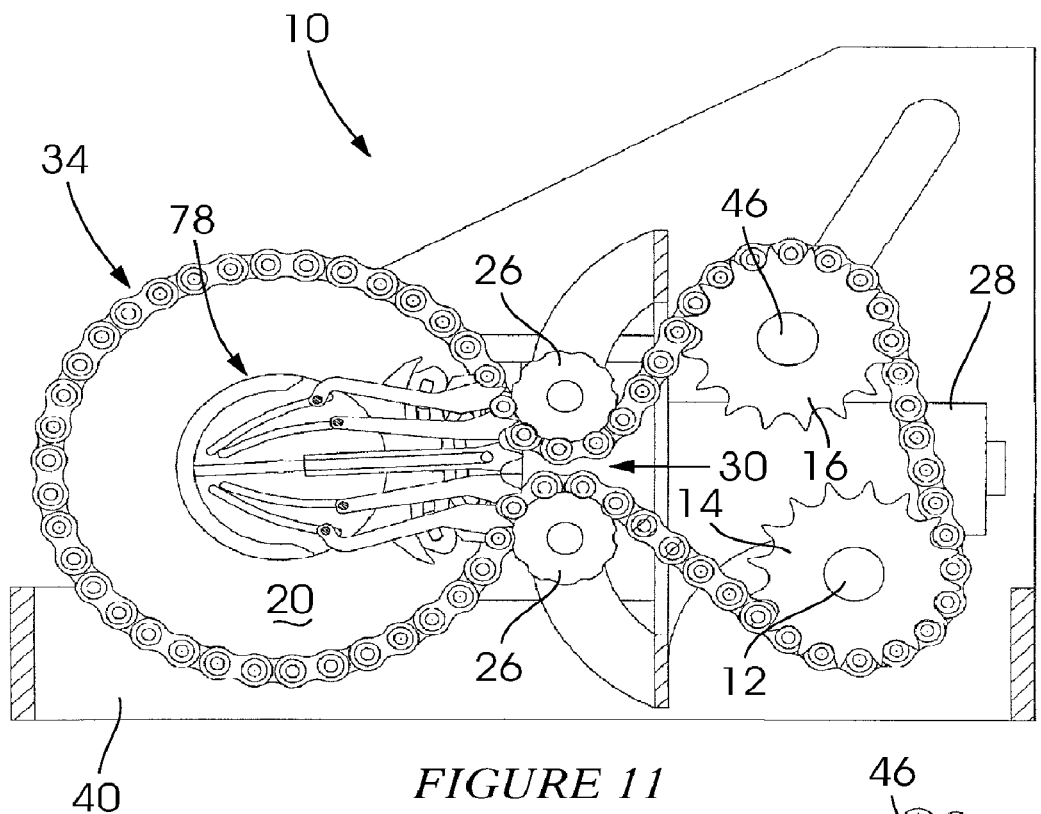
FIGS. 11 and 12 are side elevations of the FIG. 3 machine shown respectively in the low and high ratio positions of the machine.
Figure 12:
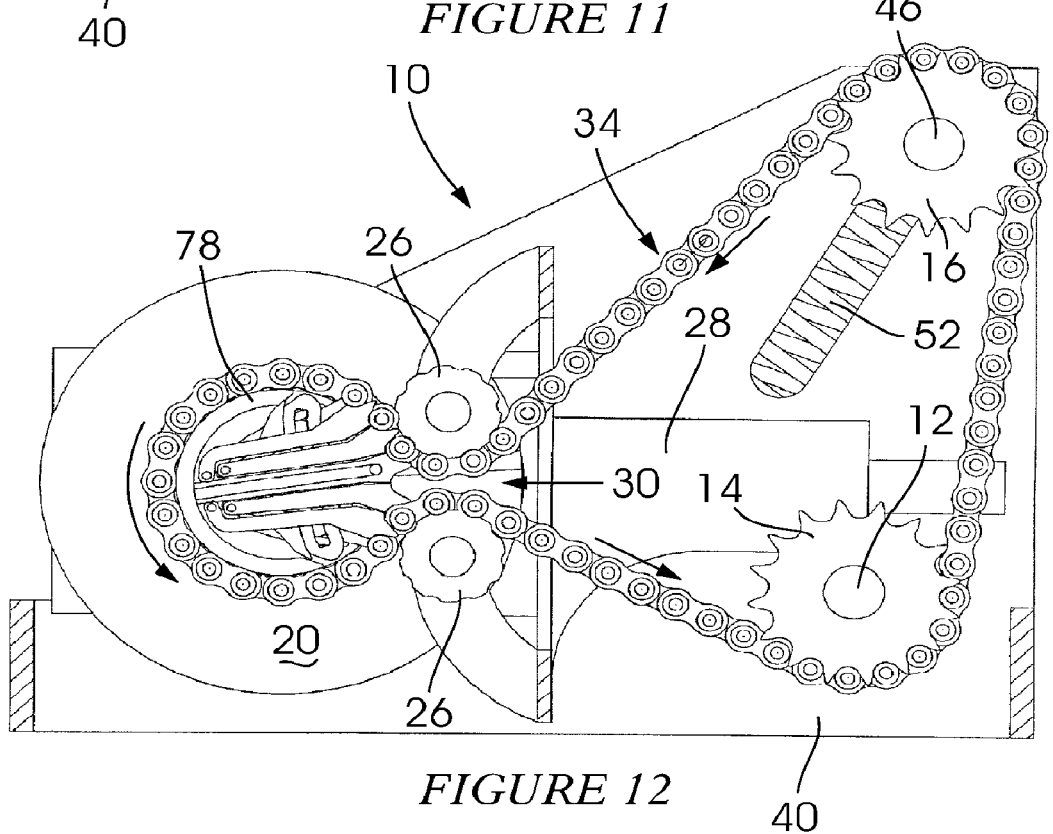

As is seen from FIGS. 3 and 4 and more clearly in FIGS. 11 and 12, the idler sprockets 26 do not have clearly pointed sprocket teeth as they play no part in the machine power transmission and are merely profiled to lightly engage the chain between its rollers 38 to guide it in and out of the throat 30 and to avoid interference with the teeth of the partial sprocket drive arrangement in the throat 30 area.

The IVT machine is located in a frame member 40 which includes two mirror image side plates 42 as shown in FIGS. 3 and 4. The frame side plates each carry bearings, not shown, in which the machine input and output shafts 12 and 22 are journaled for rotation, an incline slot 44 in which the chain tension idler sprockets 16 shaft 46 is movable, a second horizontal slot 48 and a formation 50 which carries a coil spring 52 for biasing the tension sprocket shaft 46 upwardly in its slot 44.

Figure 6:
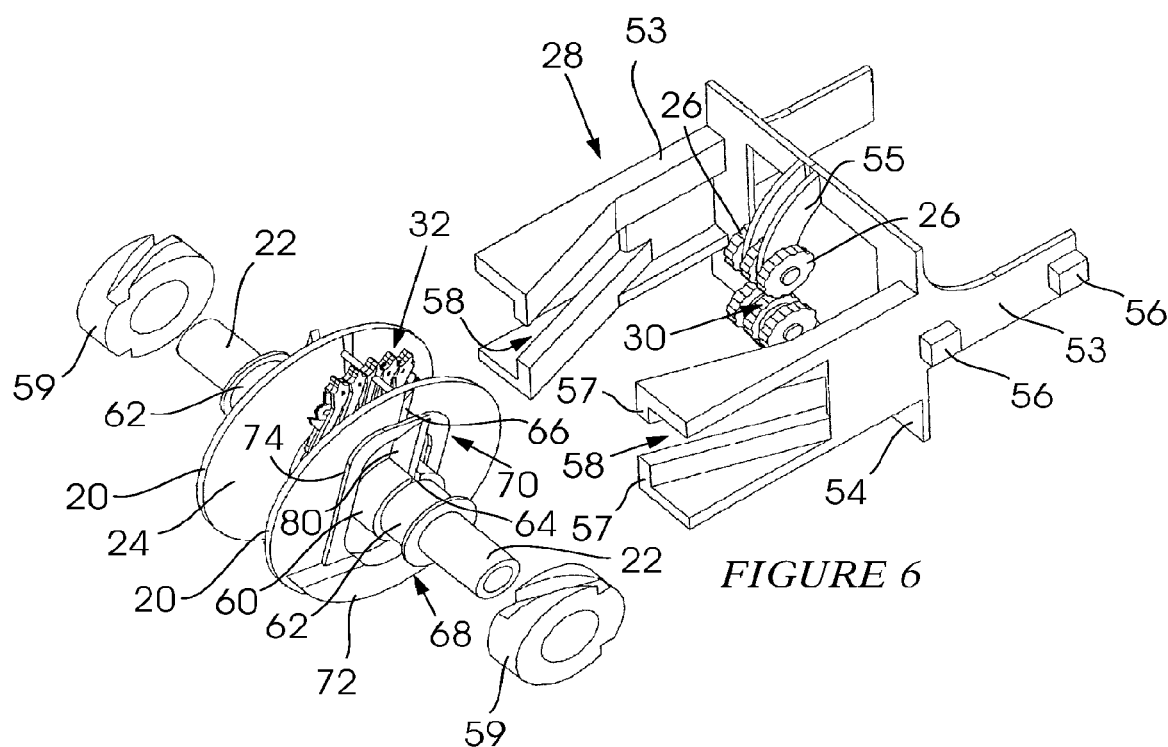
FIG. 6 is an exploded isometric view of the ratio changing disc and a frame element of the machine of FIG. 3.

FIG. 6 shows the ratio varying arrangement 18 to include the ratio changing disc 20 assembly, the machine output shaft 22 and the control frame element 28. The frame element 28 includes two side arms 53 and a cross member plate 54 which holds the arms in the spaced relationship shown in FIG. 6. The plate 54 carries two pairs of forwardly and oppositely directed arcuate plates 55 with each pair of plates supporting, at their free ends, an axle on which the set of three throat 30 defining sprockets 26 are freely rotatable. The arms 53 are oppositely identical and each includes a pair of outwardly projecting support formations 56 which are slidably located in the horizontal slots 48 in the frame side plates 42, as shown in FIG. 3, to guide the controlled movement of the frame element 28 relatively to the machine frame 40. The forward ends of the arms 53 are shaped as shown in the drawing to provide guide rails 57 on either side of opposite inwardly slanted guide rail slots 58.

As shown in FIGS. 6 and 7 the ratio changing discs 20 each include an integral outwardly projecting boss 60 which is recessed at 62 adjacent its outer end, a key slot 64 which is open into a substantially triangular radial slot 66 in the rear face of the disc 20 and a counterweight arrangement 68 for balancing the disc 20 arrangement during rotation.

The ratio varying disc 20 arrangement additionally includes, as shown in FIG. 6, two bushes 59 which are each grooved on opposite sides with the bases of the grooves being parallel to and spaced from each other by a dimension equivalent to the space which separates the guide rails 57 which define the slots 58 in the forward portions of the frame element 28 arms 53. The angles of the grooves across the outer surfaces of the bushes 59 correspond to the slant angles of the slots 58.

In the assembled ratio varying arrangement 18 the bushes 59 are located in the recesses 62 in the bosses 60 of the ratio changing discs 20. The bushes are freely rotatable on the bosses 60. The guide rails 57, on either side of the slanted frame element 28 slots 58, are slidably located in the grooves in the bushes 59. With this arrangement the frame element is movable towards and away from the relatively fixed disc 20 assembly with its arms 53 supported in and guided by the grooves in the bushes 59 to vary the ratio of the machine by moving the discs 20 away from and towards each other while the flat outer surfaces of the bushes remain normal to the axis of the machine output shaft 22.

The counterweight arrangements 68 each include an inverted U-shaped control member 70 which carries an arcuate balancing weight 72. The control members 70 each comprise a pair of legs 74 which straddle the disc 20 bosses 60, a bridge member 76 and, on the rear faces of the legs 74 formations, not shown, which are engaged with and slidable in cross-sectionally T-shaped grooves, also not shown, in the outer faces of the discs to enable the counterweights to be moved towards and away from the output shaft 22.

The machine output shaft, as shown in FIGS. 7 and 8, is a two-component composite shaft 22 with each shaft portion carrying on its inner end a drive arrangement sprocket tooth guide disc 78 and a triangular counterweight control device 80.

The counterweight control devices 80 are fixed to the rear faces of the discs 78 with their bases resting on the bases of the slots 64 in the bosses 60 of the ratio changing disc 20, as shown in FIG. 7. The portions of the control devices 80 which are located in the slots 64 and 66 of the discs 20 key the discs 20, against relative rotation with respect to the output shaft 22 components and their tooth guide discs 78. The bridge members 76 of the counterweight control members 70 rest on the inclined surfaces of the triangular counterweight control devices 80. During operation of the IVT machine, centrifugal force generated by the balancing weights 72 holds the bridge members up against the sloping faces of the control devices 80 with the movement of the discs 20, and the control devices 80, towards and away from each other during ratio variation causing the counterweight arrangement bridge members 76 to move the counterweights against the sloping faces of the devices 80 towards and away from the output shaft 22 axis to balance the pre-calculated mass imbalance of the disc 20 assembly, such as that which will be caused by the eccentric disposition of the drive arrangement 32 and other components, in the disc assembly.

Figure 9:
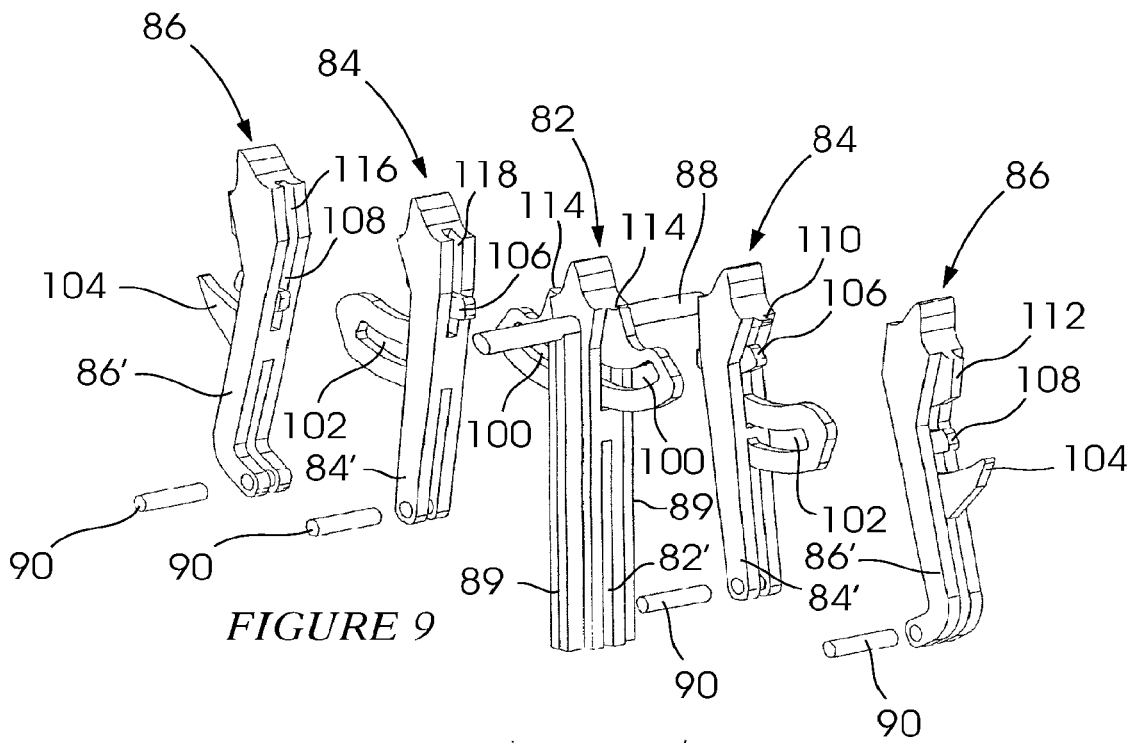
FIG. 9 is exploded isometric views of the tooth assembly of the drive arrangement of FIG. 8.

The drive arrangement 32 partial sprocket tooth assembly, as shown in FIGS. 8 and 9, comprises a single central tooth 82 and a further two pairs of teeth 84 and 86. The partial sprocket teeth are carried by lever arms $82^1$, $84^1$, and $86^1$, as shown in FIG. 9 with the teeth of each pair of teeth 84 and 86 and their lever arms being mirror images of each other on opposite sides of the central tooth arm. The sprocket tooth 82 lever arm $82^1$ carries adjacent the tooth 82, a transverse pin 88 which has angled ends as shown in FIGS. 7 and 9 which, like the link pins 36 of the chain 34, is moved, while remaining engaged with the chain, radially outwardly and inwardly between the faces 24 of the discs 20 as the discs are moved towards and away from each other on the output shaft 22. The lever arm $82^1$ additionally includes vertical ribs 89 which extend, on opposite sides of the arm $82^1$ between the pin 88 and the free end of the arm. The remaining arms of each pair of tooth arms $84^1$ and $86^1$ each carry, at their lower ends, a transverse pin 90 which is anchored in and projects from both sides of the tooth arm lever.

The tooth guide discs 78 on the output shaft components 22 each carry a central almost diametrical slot 92 and on either side of the slot a pair of adjacent grooves 94 and a pair of outer grooves 96. The grooves 94 and 96 are, as is more clearly seen in FIG. 10, bowed and fanned outwardly in the faces of the discs from positions adjacent the base of the slot 92.

The tooth guide discs 78 each additionally include a raised partially peripheral spacer rim 98, as shown in FIG. 8, by means of which the two guide discs and the output shaft portions are coupled together by means of countersunk screws, not shown, with the tooth arms $82^1$, $84^1$ and $86^1$ located in and projecting from the open topped cavity between the discs. The fairly substantial ribs 89 on the tooth arm $82^1$ are slidably located in the disc 78 slots 92 and serve as the torque transmission means between the chain 34 and the output shaft 22. The pins 90 on the remaining tooth arms $84^1$ and $86^1$ are slidably located in the grooves 94 and 96, as shown in FIGS. 10, 11 and 12.

Figure 10:
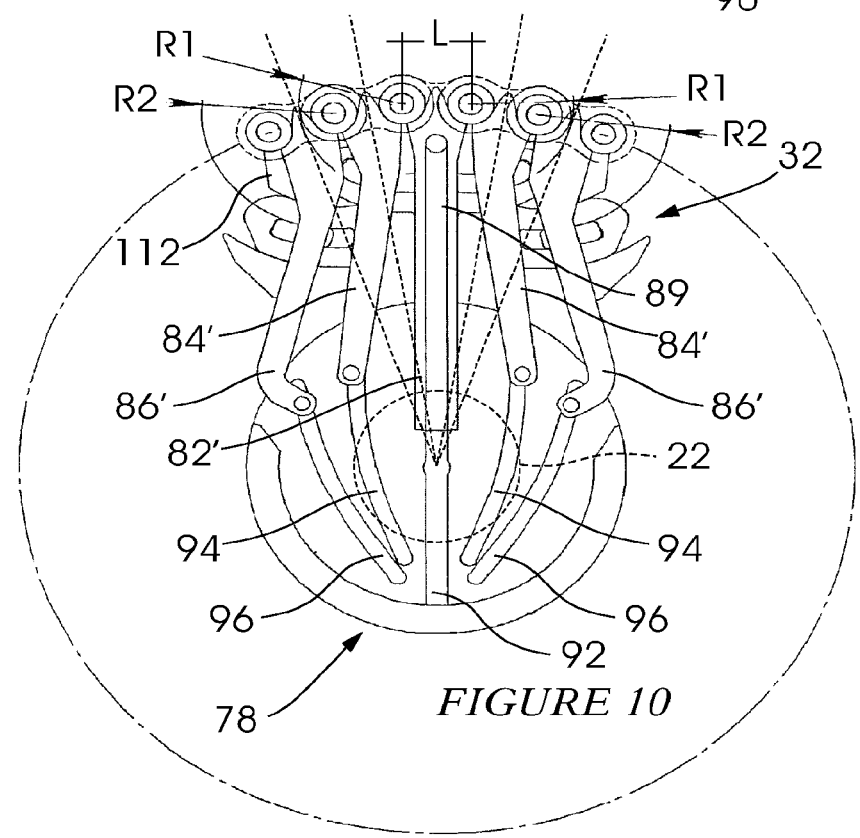
FIG. 10 is a partially diagrammatic front elevation of the assembled drive arrangement of the machine as shown in the low ratio position of the machine.

The drive arrangement 32 partial sprocket tooth assembly is more clearly shown in FIGS. 9 and 10. Each of the teeth and the arms which carry them are manufactured from suitable metal plates which are laminated together.

The tooth arm $82^1$ includes two outwardly projecting ears which each carry an arcuate slot 100 which, as shown in FIGS. 9 and 10, has its radius $R^1$ of curvature centred on the link pin axis of a chain roller 38 which is engaged, in use, with the tooth 82 on the side of the tooth arm which carries the ear in which it is located. The tooth arms $84^1$ each include a single projecting ear which is directed away from the tooth arm $82^1$ and carries an arcuate slot 102 with its radius of curvature $R^2$ centred on the axis of link pin 36 chain roller 38 which is engaged with the side of the tooth arm $84^1$ from which the slotted ear projects. The tooth arms $86^1$ each carry an outwardly projecting ear 104 which has a curved upper surface, which is centred on $R^2$ on which the underside of the ears on the tooth arms 84 are supported.

The transverse sides of the tooth lever arms $84^1$ and $86^1$ are centrally slotted over their lengths above and below the projecting ears which they carry, as shown in FIG. 9. The upper portions of the slots below the teeth 84 and 86 carry fixed curved guide members 106 and 108 respectively. The guide members 108 are, in the assembled tooth assembly, located to be nice sliding fits in the slots 102 of the ears on the tooth arms $84^1$ with the guide members 106 similarly located in the slots 100 in the ears of the tooth arms $82^1$.

To provide an unbroken partial sprocket surface between the teeth 82, 84 and 86 for supporting the chain 34 rollers 38, the lower portions of the teeth are outwardly flared on a radius equivalent to that of the outer surfaces of the chain rollers 38.

To preserve the continuous chain support surface, as the teeth 82, 84 and 86 are moved relatively to each other by their lever arms as the chain radius between the disc 20 faces 24 is varied in use, the teeth 84 and 86 each carry only on their outwardly facing sides in the assembly keys 110 and 112 and the central tooth 82 a key 114 on each side of the tooth. The upper surfaces of the keys are all curved to be continuations of the flared lower portions of the teeth. The keys 110 on the teeth 84 are slidably located in slots 116 on the inwardly facing sides of the tooth arms $86^1$ and the keys 114 are similarly located in slots 118 on the arms $84^1$.

The partial sprocket drive arrangement 32 is, in FIGS. 10 and 11 shown in the low ratio position of the transmission machine with the centres of the sprocket teeth situated on dotted radial lines, shown in FIG. 10, from the axis of the machine output shaft 22, to be optimally engaged between and seated on adjacent chain link rollers 38. As mentioned above, it is necessary that this orientation of the teeth 82, 84 and 86, relatively to the chain rollers and the machine output shaft axis, is maintained as the machine ratio is changed from the FIGS. 10 and 11 large radius low ratio position of the drive arrangement 32 and the smaller radius high ratio position as shown in FIG. 12.

The limit positions of movement of the teeth 82, 84 and 86 and their arms between the machine output shaft tooth guide discs 78 are illustrated in FIGS. 11 and 12.

In the FIGS. 10 and 11 low ratio position of the chain 34 and drive arrangement 32 tooth assembly the tooth arms $84^1$ and $86^1$ are spread apart, as shown in the drawings by their pin 90 locations in the grooves 94 and 96 and away from the diametrical slot 92 which guides radial movement of the tooth arm $82^1$ and so the entire interconnected tooth assembly.

In moving from the FIGS. 10 and 11 low ratio position of the chain 34 between the separating discs 20, on demand from the machine controller, towards the FIG. 12 high ratio position the chain link pins 36 and the tooth assembly arm $82^1$ pin 88 are moved, by the chain 34 tension, radially inwardly against the conical faces 24 of the discs to enable the chain radius of rotation to be reduced relatively to the output shaft axis. In so doing the partial sprocket tooth arms are moved downwardly in their pin 90 grooves 94 and 96, as shown in FIG. 10, and towards each other, as shown in FIG. 12. In the tooth assembly moving to this high ratio position of the machine the outwardly inclined tooth carrying portions of the tooth arms $84^1$ and $86^1$ have been partially rotated, on the radii $R^1$ and $R^2$ respectively, to fan the dotted radial lines, which pass centrally across the teeth, as shown in FIG. 10, outwardly to increase the angle between them, as shown in FIG. 12, while remaining centred on the output shaft 22 axis in all ratio positions between the low and high ratio positions shown in FIGS. 1, 11 and 12. The above groove 94 and 96 and slot 100 and 102 controlled movement of the tooth arms ensures that the teeth 82, 84 and 86 will always, in all ratio positions of the machine be optimally engaged between and with the adjacent chain rollers irrespectively of the velocity of the chain and so the ratio changing discs 20 and their composite output shaft 22.

As is mentioned above with reference to FIGS. 1, 6 and 7 the frame element 28, which is engaged with the ratio changing discs 20 assembly bushes 59 and which carries the chain throat 30 defining sprockets 26, is movable by the machine control means towards and away from the disc 20 assembly and the output shaft which it carries in incremental steps. The purpose of this incremental movement is precisely to control the length of chain 34 which is introduced into and taken from the chain circle between the discs 20 over the sprockets 26 during ratio changing of the machine in operation.

In this embodiment of the invention the chosen chain link length is, as shown in FIG. 10, the length L of one chain link as measured between the axes of adjacent link pins 36. The incremental movement of the frame element 28 by the machine controller will result in one link of the chain being added to or removed from the chain circle to ensure that the chain gaps between the chain link rollers 38 will be absolutely synchronised with the various teeth of the drive arrangement 32 tooth assembly on both internal sides of the chain in the throat 30 as the tooth assembly traverses the throat, as shown in both FIGS. 11 and 12. As mentioned above this ratio changing chain movement onto or out of the chain circle between the discs 20 must only be performed when the teeth of the drive arrangement 32 partial sprocket tooth assembly are clear of the chain throat 30. This synchronisation of the chain arrangement teeth with the chain 34 link gaps makes clean and perfect engagement of the teeth with the chain possible at all design output angular velocities of the output shaft 22, which could be as high as 6000 rpm, without any interruption of either torque transmission or output angular velocity.

As mentioned in the preamble to this specification many known apparently competent IVT's of the above described type rely on the use of one-way or sprag clutches for their operation with the sprag clutches eliminating the possibility of power transmission in both directions through the machines. In the transmission machine of the invention which is described above there is, however, no impediment to transmission of power from the output shaft 22 to the input shaft 12 so making the machine totally suited to engine braking.

Figure 1A:
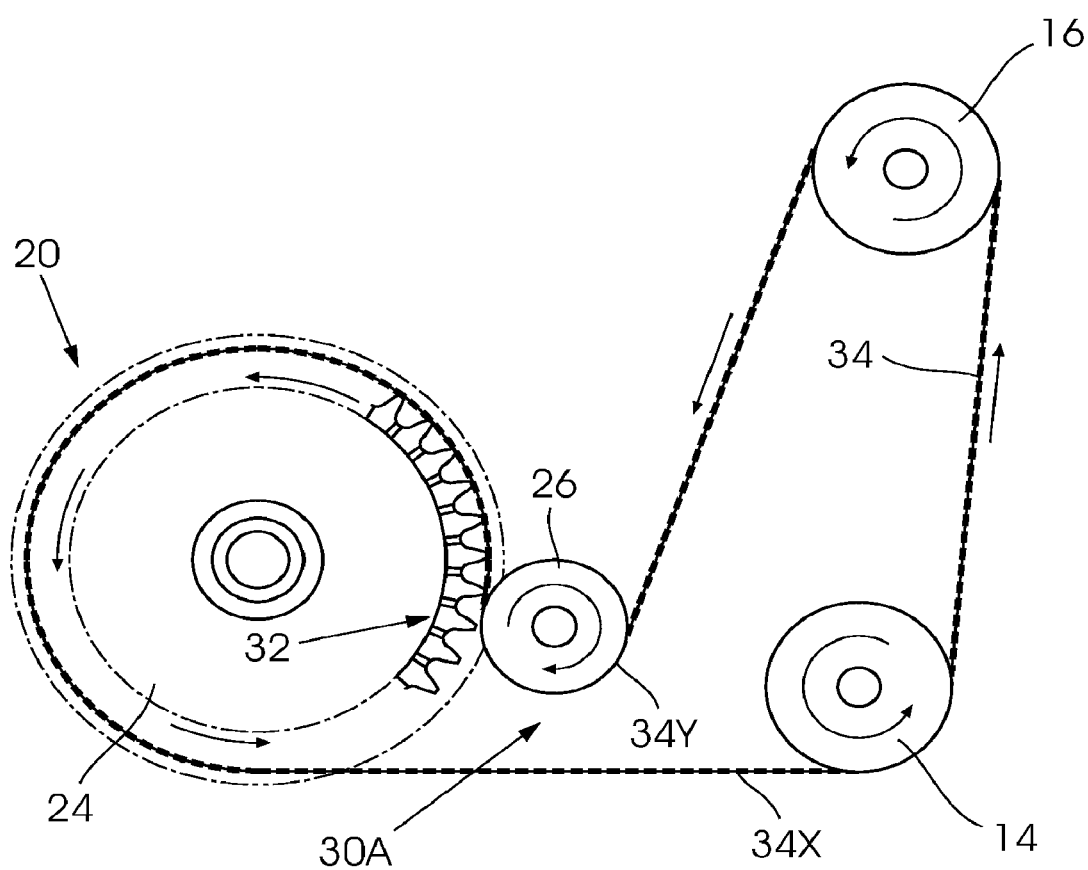
FIG. 1A shows a possible modification to the arrangement of FIG. 1.

The preceding description, to the extent it is dependent on the configuration shown in FIG. 1, applies with equal effect to the possible variation shown in FIG. 1A where one of the guide wheels or sprockets 26 (say the upper sprocket in FIG. 1) is eliminated. The desired chain throat 30A is formed, instead, by a first portion 34X of the chain which goes directly to the conical discs, and by passing an opposing second chain portion 34Y over the remaining sprocket 26, which is placed close to the chain portion 34X, at a suitable spacing from the first chain portion. In other respects the varied configuration of FIG. 1A functions effectively the same as the arrangement of FIG. 1 and offers the same features and benefits.

The guide wheel or sprocket 26, as the case may be, may serve as an input drive to the machine and may thus be used to drive the chain (belt). The same principle can be used if two sprockets 26 are employed, as is shown in FIG. 45, to enable the machine to feed in and extract chain lengths onto the conical disks to enable power transmission in both directions by employing one way clutches into sprockets 26 while coupling them together in a gear ratio not equal to 1:1. This arrangement will isolate any chain tensioning mechanism, that might be employed, from the power transmission load.

Figure 13:
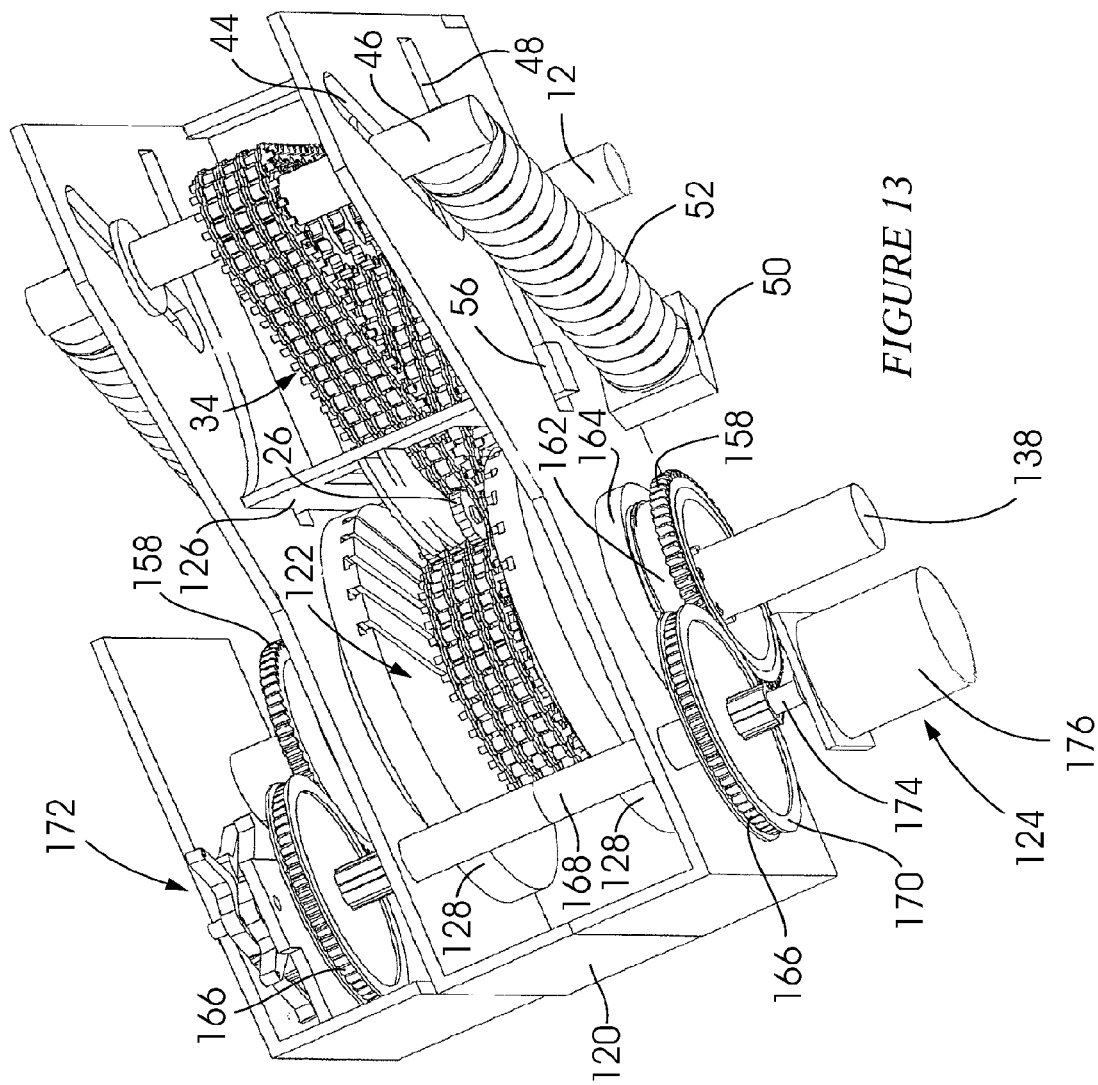
FIG. 13 is a perspective view from above of a second embodiment of the IVT machine of the invention.

A second embodiment of the IVT machine of the invention is shown in FIG. 13 to include a static frame member 120 which carries a ratio changing assembly 122 and an indexing arrangement 124. The machine additionally includes a frame element 126 which is movably attached to the frame 120 for movement, by means of the lead screw or electronically controlled hydraulic arrangement of the first embodiment, towards and away from the ratio changing assembly 122. The frame element 126 is substantially the same as the frame element 28 of the first embodiment of the machine but does not include the forward ends of the arms 53 which carry the slanted guide rails 57 as the ratio changing movement of the assembly 122 is operated, in this embodiment of the invention, by the indexing arrangement 124. The drawing reference numbers of components of the frame element 28 which are used to identify components and formations which are the same as those in this second embodiment, are used in FIG. 13.

Figure 14:
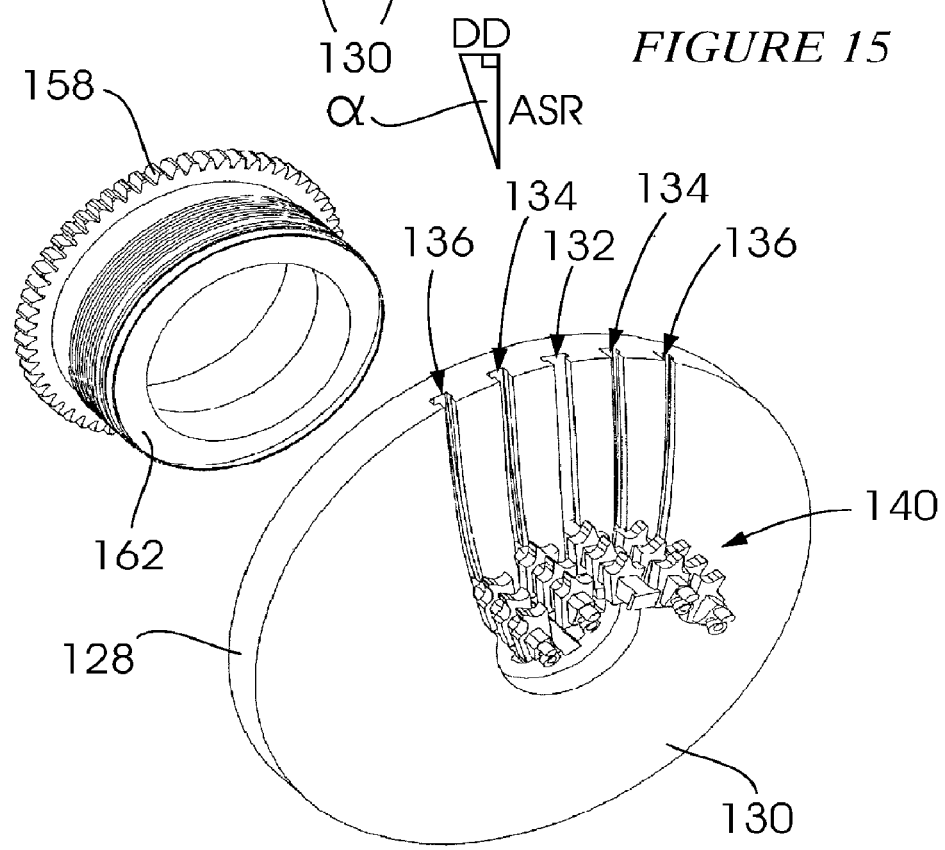
FIG. 14 is an exploded view of a ratio changing disc, the ratio changing gear of the disc and the drive arrangement of the FIG. 13 machine.

The ratio changing assembly 122 includes two ratio changing discs 128, as shown in FIGS. 14 and 19 which each carry on their tapered facing faces 130, as best seen in FIG. 19, a central linear groove 132 which is centred on the axis of a splined output shaft 138, and two pairs of outer grooves 134 and 136 with one groove of each pair situated on opposite sides of the central groove 132. The grooves 134 are inwardly bowed from their outer towards their inner ends with their rate of curvature increasing towards their lower ends. The grooves 136 are similarly bowed with their rate of curvature, as seen in FIG. 19, being more exaggerated than that of the grooves 134 towards their lower ends. The groove 132 is, as seen in FIGS. 14 and 19, is undercut and is uniformly T-shaped in cross-section over its length while undercut portions of the grooves 134 and 136, shown in dotted lines in FIG. 19, are out of symmetry with the open outer portions of the grooves for a purpose which is explained below.

The drive arrangement 140, in this embodiment of the invention, as shown in FIGS. 14, 16 and 19, comprises, together with the disc grooves 132, 134 and 136, a central tooth carrier 142, a first pair of tooth carriers 144 which are adjacent the carrier 142 and a second pair of outer tooth carriers 146.

The drive chain used with the machine of this second embodiment remains the chain 34 of the first embodiment and each of the tooth carriers includes three transversely aligned sprocket teeth which are shaped as shown in FIGS. 14, 16 and 19 with the teeth of each pair of tooth carriers 144 and 146 being, on opposite sides of the central carrier 142, mirror images of each other. As is clearly seen in FIG. 16, the base portions of each of the sprocket teeth on the tooth carriers are outwardly flared, as are those of the previous embodiment, to provide seats for supporting chain rollers 38 on either side of a chain link with which the tooth is engaged in all ratio changing positions of the chain between the discs 128.

The teeth on each of the tooth carriers are fixed to a crossbar 148 and are spaced from each other by a dimension which corresponds to the transversely aligned gaps between the rollers 38 of the chain 34.

The ends of the tooth carrier 142 crossbar 148 each carry a transverse rectangular formation 150 which is angled complementally to the angle of taper of the faces 130 of the facing ratio changing discs 128 and so also the undercut portions of the bases of the disc grooves 132 in which they are slidably located.

The ends of the tooth carriers 144 and 146 each include, as shown in FIG. 16, an upper outwardly projecting cylindrical formation 152 with its end complementally tapered to the base of the disc groove in which it is located, in use, and a second formation 154 which consists of a cylindrical stem which carries on its free end a radially projecting disc 156. The cylindrical formations 152 each have a diameter which is a close sliding fit in the outer portions of the grooves 134 and 136 in the faces of the discs 128. The formation 154 stem has a lesser diameter than that of the formations 152 with its axis being downwardly inclined relatively to that of the formation 152 so that the axis is normal to the base of a disc 128 groove 134 or 136 in which it is located, in use, with the outer surface of its disc 156 coplanar with the tapered face of the formation 152. The formation 154 disc 156 has a thickness and diameter which is a nice sliding fit in the undercut portions of the grooves 134 or 136. The upper surfaces of the discs 156 trap the tooth carriers in the grooves against upward or downward movement from their selected ratio positions in the grooves as determined by the degree of separation of the discs.

In the assembled ratio changing disc assembly 122 and its drive arrangement 140 assembly, the tapered ends of the formations 150, 152 and 154 on the tooth carriers 142, 144 and 146 respectively, serve the same purpose as the tapered ends of the chain 34 link pins 36, as described in connection with the IVT machine of the first embodiment, in wedging against the bases of the disc 128 grooves in which they are located to prevent uncontrolled radial movement of the tooth carriers away from the machine output shaft axis when they are out of contact with the chain 34 when traversing the throat 30 between the sprockets 26 and to enable the tooth carriers to be moved inwardly or outwardly between the discs 128 while their teeth remain exactly engaged with the chain 34 to vary the input/output ratio of the machine as the discs 128 are moved away from and towards each other on the output shaft 138, as is described below.

As is the case with the teeth of the tooth assembly of the previous embodiment of the machine, it is necessary that the teeth of the tooth carriers 144 and 146 be slightly rotated outwardly and away from the tooth carrier 142 and moved closer together as the drive arrangement 140 is moved in their discs 128 grooves 134 and 136 by the chain tension, together with the five tooth carriers 142, 144 and 146, towards the machine output shaft, high ratio, small sprocket radius position, as shown in FIG. 13. This is achieved, in this embodiment of the invention by the discs 156 of the tooth carrier formations 154 being moved from the upper position in FIG. 19 to their dotted lower line positions. In this position the offset undercut portions of the grooves 134 and 136 have slightly rotated the formation 154 discs 156 and so the tooth carriers 144 and 146 and their teeth about the axes of their formations 152 to compensate for the reduction in chain track radius between the discs 128 while keeping the tooth carrier teeth perfectly engaged with the chain. This remains critically important as the drive arrangement 140 teeth traverse the chain throat 30 with its outer teeth engaged with the chain on either side of the throat. In returning the machine to its low ratio, increased chain track radius position the tooth carriers and the chains are moved outwardly between the closing discs 128 with the undercut portion of the grooves 134 and 136 now rotating the tooth carriers 144 and 146 and their teeth in the opposite direction to compensate for the increasing chain track radius.

The circumferential spacing of the tooth centres between the tooth carriers 142, 144 and 146 in this embodiment of the machine is 2×L as opposed to L in the first embodiment.

As with the machine of the previous embodiment, it remains important that any ratio changing, chain lengthening or reduction that takes place between the discs 128 is caused to occur only while the partial sprocket teeth of the drive arrangement 140 are clear of the throat 30 zone of the chain track between the discs 128.

Figure 15:
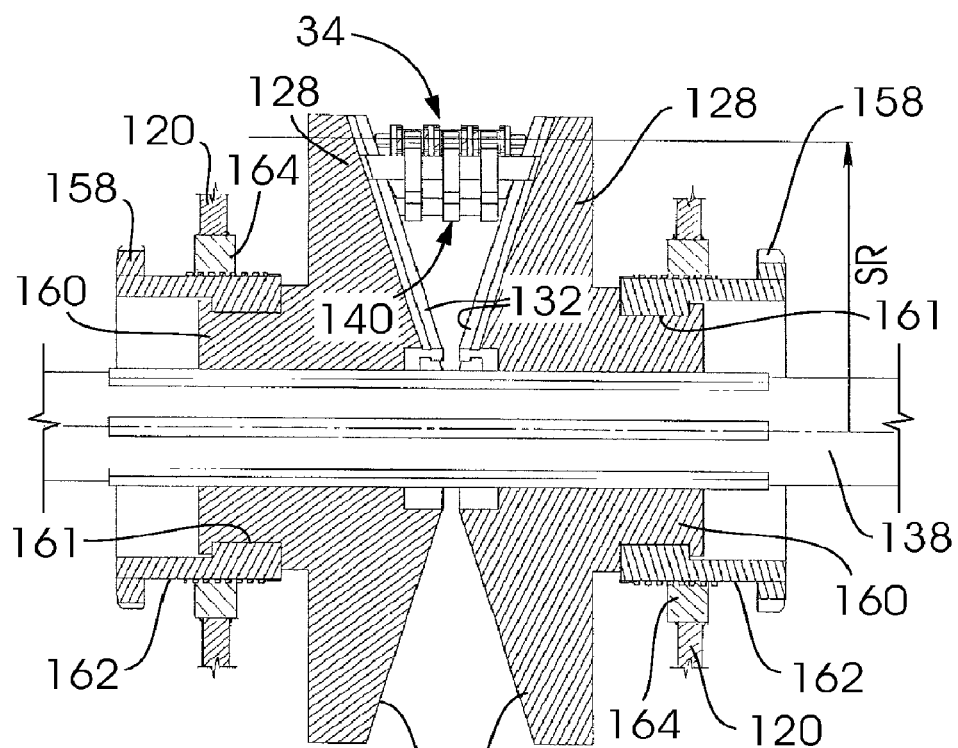
FIG. 15 is a sectioned front elevation of the ratio changing arrangement of the FIG. 13 machine.

As shown in FIGS. 13, 14 and 15 the tapered ratio changing discs 128, in this embodiment of the invention, each include a ratio changing gear 158, as shown in FIG. 15. The gears 158 are fixed to and spaced from the outer surfaces of the discs 128 by cylindrical carriers 162 which are rotationally engaged and freely rotatable in recesses 161 in the bosses 160 on the discs as shown in FIG. 15. The carriers 162 are externally threaded and threadedly engaged with internally threaded rings 164 which are fixed in the side walls of the frame 120 compartment which houses the ratio changing assembly 122. The threads on the carriers 162 and the rings 164 are such that, during ratio changing of the machine, the discs 128 will concomitantly be moved towards and away from each other while the gears 158 are rotated in a common direction.

The gears 158 are, as shown in FIG. 13, meshed with and rotated, in use, by indexing gears 166 of the indexing arrangement 124. The gears 166 are rotated by and are movable in an axial direction on splined ends of a tubular shaft 168 which is rotatable in bearings, not shown, in the side walls of the ratio changing assembly 122 compartment of the frame member 120. The gears 166 each include annular side plates 170 which project radially outwardly from the gear teeth, as shown in FIG. 13, to provide a rotary channel in which the toothed portions of the gears 158 in the mesh zone of the gears, are trapped so that movement of the gears 158 towards and away from the machine frame during ratio changing will cause the gears 166 to follow their movement on the splined ends of the shafts 168 to hold the gears in mesh without the need for much wider and heavier gears 166.

The indexing arrangement 124 additionally includes an indexing trigger arrangement 172 which is situated in a compartment of the frame member 120 on the outside of the upper gear 166 in FIG. 13, a torsion bar 174 which is rotatably located in the bore of the shaft 168 and has one end fixed in any suitable manner to the shaft at or towards its end which carries the trigger arrangement 172 and a geared motor 176 which is connected to the second end of the torsion bar 174 which projects from the shaft 168 on the outside of the frame 120.

The trigger arrangement 172 is shown in FIGS. 17 and 18 to be composed of two identical pawl and ratchet arrangements which are located in a back to back configuration on the splined end of the shaft 168. Each of the rotary ratchets 178 carries six ratchet teeth 180 which are uniformly spaced from each other, in this embodiment of the invention, at 60° intervals about the ratchet periphery. The trigger pawls 182 are shaped as shown in the drawings and are each partially rotatable about a common pin 184 the ends of which are anchored in the side walls of the frame compartment in which the trigger arrangement is located, as shown in FIG. 13.

The control arrangement for the FIG. 13 machine includes the lead screw or an electrically operable hydraulic indexing arrangement for moving the frame element 126 towards and away from the frame member 120, and a trigger controller not shown for triggering predetermined incremental indexed movement of the ratio changing discs towards and away from each other. The trigger controller is the prime controller and additionally controls indexed movement of the frame element 126 arrangement.

In operation of the FIG. 13 machine, incremental ratio changing movement of the discs 128 and so the chain track 34 between them is, as with the machine of the previous embodiment, prevented by the machine control arrangement while the partial sprocket arrangement 140 is in the chain throat 30 zone between the discs 128.

With the machine operating and on a command from the primary trigger controller to shift the machine ratio upwardly or downwardly the controller electronics will activate the motor 176 to apply the appropriate torque to and energise the torsion bar 174 in whatever direction has been selected. The shaft 168 is in the meantime held locked against rotation by the trigger pawls 182 which lock the ratchet discs 178 against rotation in either direction, as shown in FIG. 17.

Whichever trigger pawl 182 is required to be operated against the bias of the torsion bar 176 acting on the ratchets 178 via the shaft 168 is now triggered in the direction of one of the arrows in FIG. 17 to release the tooth of the ratchet engaged with it to the stored energy of the torsion bar 174. On release, the ratchets 178 are immediately snap rotated in the required direction to cause the shaft 168, the gears 166 and the gears 158 to be incrementally rotated to move the discs 128 towards or away from each other as required. The ratchet trigger pawls 182 are gravity biased towards the ratchets 178 and assuming the ratchet in FIG. 18 is rotated in an anticlockwise direction, the ratchet tooth 180 which has been released will move the nose of the pawl downwardly onto the ratchet to engage the following tooth as shown in FIG. 18. To more positively reset the pawls 182 a spring could be located between and connected to the upwardly projecting trigger arms of the pawls to bias the arms towards each other. To rotate the gears 158 in the opposite direction the motor 176 is rotated by the controller to torque load the ratchets 178 in the opposite direction.

The above method of using a mechanical device (torsion bar 174) as a triggering energy storage device eliminates the need for far more costly and complicated high power electrical or hydraulic energy storage devices for achieving the same purpose.

Obviously, as with the machine of the first embodiment, it will be necessary, in synchronisation with the operation of the indexing arrangement 124, to incrementally move the frame element 126 towards or away from the ratio changing assembly 122 to feed chain into or from the chain track between the discs 128. This is achieved, in this embodiment of the invention, in precisely the same manner as the frame element 28 is moved in the machine of the first embodiment. The lead screw or electronically controlled hydraulic control arrangement for moving the frame element 126 is activated by the prime controller which controls and activates the indexing arrangement 124.

The necessary variables which are required for the calculation of the centre lines of the disc 128 grooves 134 and 136 are illustrated in FIG. 19 and are now described by way of a brief mathematical model.

Points P, G, K, M, N, and O lie on a common drive sprocket radius SR (line AG) and are all separated from each other by angle θ with reference to point A at the centre of the machine output shaft which corresponds to chain link lengths L on this drive radius SR. With the X axis being the horizontal through point A and the Y axis being the vertical through point A the X, Y co-ordinates of points H and Q can be calculated, given the drive radius SR and chain link length L, as follows:

$$L^2 = 2 \cdot SR^2 - 2 \cdot SR \cdot SR \cdot \cos(\theta) \text{ and by solving for } \theta$$
results in:

$$\theta = a\cos\left[1 - \frac{L^2}{2 \cdot SR^2}\right] \tag{A}$$

The equivalent drive radius RE at the midpoint of chain link length L at point Q to point A is therefore perpendicular to line KM and is calculated as:

$$RE = \left[SR^2 - \left(\frac{L}{2}\right)^2\right]^{0.5} \tag{B}$$

The X, Y co-ordinates of point Q are therefore as follows:

$$X: QE = RE \cdot \sin(k \cdot \theta) \tag{C}$$

$$Y: AE = RE \cdot \cos(k \cdot \theta) \tag{D}$$

Where k is the whole number multiple indicating the chain link length number away from the Y axis, in this case k=2.

The X, Y co-ordinates of point H are therefore as follows:

$$X: HF = RE \cdot \sin(k \cdot \theta) \tag{E}$$

$$Y: AF = RE \cdot \cos(k \cdot \theta) \tag{F}$$

Where k is the whole number multiple indicating the chain link length number away from the Y axis, in this case k=4.

Combining equations A to F a generalised set of equations for X, Y co-ordinates throughout the entire ratio range of the machine can be derived as follows:

$$X = \left[SR^2 - \left(\frac{L}{2}\right)^2\right]^{0.5} \cdot \sin\left(k \cdot a\cos\left[1 - \frac{L^2}{2 \cdot SR^2}\right]\right) \quad (G)$$

$$Y = \left[SR^2 - \left(\frac{L}{2}\right)^2\right]^{0.5} \cdot \cos\left(k \cdot a\cos\left[1 - \frac{L^2}{2 \cdot SR^2}\right]\right) \quad (H)$$

Where k indicates the whole number multiple indicating the chain link length number away from the Y axis.

The X, Y co-ordinates of points I and J (centrelines for the outer and inner portions of grooves respectively as SR is varied) can easily be determined by incorporating their fixed relation with respect to point H and line HA which may vary from one sprocket tooth to the other.

The above may result in two non-identical centrelines for the outer and inner portions of the grooves 134 and 136 as indicated by the dotted inner undercut portions of the grooves in FIG. 19.

In a variation of the FIG. 13 second embodiment of the machine of the invention the chain 34 and the toothed drive arrangement 140 is replaced by the curved chain link chain 184 and the grooved chain engaging drive arrangement bars 186 of FIGS. 20 and 21. As shown in the two drawings, the chain 184 is made up of curved link plates 188 which are pivotally coupled together by link pins 190 which carry spacer rollers 192 which are rotatable between the link plates 188.

The undersides of the link plates 188 are rounded into a central arch-shaped bar engaging seat formation 194, which is most clearly seen on the central facing link 188 in FIG. 20.

The ends 195 of the drive arrangement bars 186 are tapered to be complemental to and ride on the tapering bases of the grooves 132, 134 and 136 of the ratio changing disc 128 with the grooves 196 adjacent their ends located in the outer narrower outer portions of the grooves 132 to 136. Only four of the five bars 186 of the machine drive arrangement are shown in FIGS. 20 and 21.

The outer and inner undercut portions of the grooves 132, 134 and 136, when used with chain 184, are modified to be symmetrical on either side of the centreline of the grooves with this modification of the grooves requiring adaptation of the above groove centreline mathematical model to compensate for the slightly elevated positions of the bar 186 axes, when engaged in the link formations 194, relatively to the axes of the adjacent link pins 190 in a similar manner to the calculation of points I and J in FIG. 19. In this case the centrelines of the grooves may be separated from each other by the distance between the axes of link pins in a single link.

The FIG. 13 machine, other than the above variations, remains unchanged. The use, however, of the chain 184 and the drive bars 186 as the machine drive arrangement provides a simplified chain engagement design in which the torque which is imposed on the tooth carriers 142, 144 and 146 is eliminated.

The following example is provided to demonstrate the incremental chain movement during ratio changing of the machine of the invention:

Assume a chain link length L=12.7 mm and that the circular chain track between the discs 20 needs to vary its length from the high ratio links HRL=20 to its low ratio links LRL=40 chain link lengths then $\theta_{HRL}=360°/20=18°$ (the angle of one chain link with reference to the input shaft axis with a circumference of HRL=20) and $\theta_{LRL}=360°/40=9°$ (the angle of one chain link with reference to the input shaft axis with a circumference of HRL=40).

Using equation A $$\theta = a\cos\left[1 - \frac{L^2}{2 \cdot SR^2}\right] \quad (A)$$

SR can be calculated as $$SR = \left[\frac{L^2}{(2 - 2 \cdot \cos(\theta))}\right]^{0.5} \quad (I)$$

The table below provides values of chain link lengths RL on the circumference of the discs 20 from HRL=20 to LRL=40 with the corresponding θ and ratio change percentage calculated as:

$$\text{Ratio change \%} = \frac{100}{RL} \quad (J)$$

The corresponding disc 20 displacement DD of each disc is related to the chain link pin 36 cone angle α (FIGS. 5 and 15) and is calculated as follows:

$$DD = SRC \cdot \tan(\alpha) \quad (K)$$

where SRC is the change in SR for consecutive chain link lengths.

If a lead of LS=4.4 mm/revolution is assumed for the ratio changing gear 158 then the rotation ASR required by the adjusting nut will be a constant of:

$$ASR = \frac{360 * DD}{LS} = 60° \quad (L)$$

as indicated in the following table:

| RL chain links | Ratio Change % | Theta deg | SR mm | SRC mm | DD mm | ASR deg |
|---|---|---|---|---|---|---|
| 20 | 5.0 | 18.0 | 40.6 | 2.0 | 0.7 | 60 |
| 21 | 4.8 | 17.1 | 42.6 | 2.0 | 0.7 | 60 |
| 22 | 4.5 | 16.4 | 44.6 | 2.0 | 0.7 | 60 |
| 23 | 4.3 | 15.7 | 46.6 | 2.0 | 0.7 | 60 |
| 24 | 4.2 | 15.0 | 48.6 | 2.0 | 0.7 | 60 |
| 25 | 4.0 | 14.4 | 50.7 | 2.0 | 0.7 | 60 |
| 26 | 3.8 | 13.8 | 52.7 | 2.0 | 0.7 | 60 |
| 27 | 3.7 | 13.3 | 54.7 | 2.0 | 0.7 | 60 |
| 28 | 3.6 | 12.9 | 56.7 | 2.0 | 0.7 | 60 |
| 29 | 3.4 | 12.4 | 58.7 | 2.0 | 0.7 | 60 |
| 30 | 3.3 | 12.0 | 60.7 | 2.0 | 0.7 | 60 |
| 31 | 3.2 | 11.6 | 62.8 | 2.0 | 0.7 | 60 |
| 32 | 3.1 | 11.3 | 64.8 | 2.0 | 0.7 | 60 |
| 33 | 3.0 | 10.9 | 66.8 | 2.0 | 0.7 | 60 |
| 34 | 2.9 | 10.6 | 68.8 | 2.0 | 0.7 | 60 |
| 35 | 2.9 | 10.3 | 70.8 | 2.0 | 0.7 | 60 |
| 36 | 2.8 | 10.0 | 72.9 | 2.0 | 0.7 | 60 |
| 37 | 2.7 | 9.7 | 74.9 | 2.0 | 0.7 | 60 |
| 38 | 2.6 | 9.5 | 76.9 | 2.0 | 0.7 | 60 |
| 39 | 2.6 | 9.2 | 78.9 | 2.0 | 0.7 | 60 |
| 40 | 2.5 | 9.0 | 80.9 | 2.0 | 0.7 | 60 |

Note that the constant ASR is an approximation since if L is large in comparison to SR the approximation will not be valid.

To put the control of the shifting in perspective assume a disc 128 and output shaft 138 speed of 3000 rpm or 50 revolutions per second or 20 ms per revolution. Assume that the transition area over the throat 30, where no shifting can take place constitutes 60°. Then the available time for shifting ST is calculated as $$ST = \frac{360 - 60}{360} \cdot 20 \text{ ms} = 16 \text{ ms}$$

in which time the discs need to be moved 0.7 mm or the ratio changing gears 158 need to be rotated through 60° depending on the control system and mechanism in use. The average disc speed may be calculated as:

$$\frac{0.7 \text{ mm}}{16 \text{ ms}} = 43.75 \text{ mm/s}.$$

The control of the control frame element 126, which movement corresponds to SRC, is to be synchronised with the ratio changing gears 158 in the case of the second embodiment but may be delayed or advanced as is discussed below.

Whenever the machine of the invention is shifting up to a higher ratio (SR is decreasing) the movement of the control frame element 28 may be delayed and extended since the transmission would still be able to function if the throat 30 idler sprockets 26 are 2 mm further away from the chain path on the discs 120 and can thus be adjusted after shifting has occurred which would simplify the control dramatically since the time duration is not critical as in the case of the discs 120 movement.

Whenever the machine of the invention is shifting down to a lower ratio (SR is increasing) the movement of the control frame 126 needs to occur before the movement of the discs 120 in order to prevent a collision between the idler sprockets 26 and the partial sprocket drive arrangement 32, but again as mentioned above the time duration is not critical and the control would be simplified.

In the event that the IVT machine of the invention is to be used in a motor vehicle the control can further be simplified by making use of the positive engagement high torque nature of the IVT by connecting the output shaft directly via a differential to the wheels of the motor vehicle in which case the maximum speed of the output shaft would thus be in the order of 1300 rpm (maximum wheel rpm) thus further increasing the shifting time.

Figure 23:
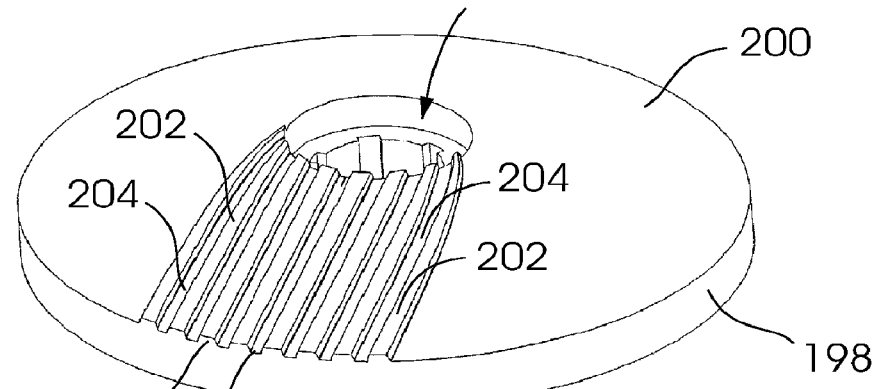
FIG. 23 is a perspective view of the ratio changing disc of the FIG. 22 machine.
Figure 24:
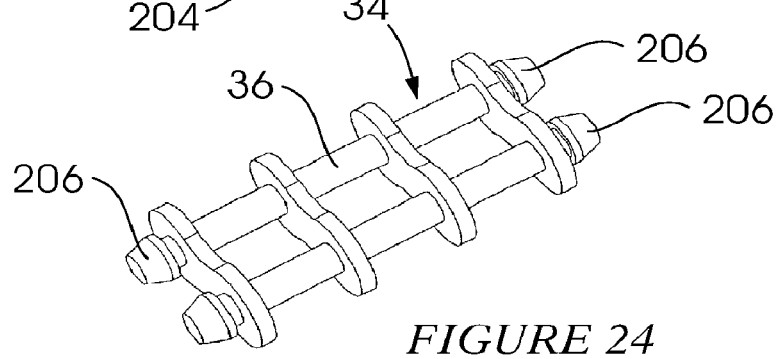
FIG. 24 is a portion of a chain for use with the FIG. 22 machine.

In a third embodiment of the IVT machine of the invention the frusto conical ratio changing discs 128 and the chain 34 of the machine of the second embodiment are replaced by the discs 198 and the modified chain 34 of FIGS. 23 and 24.

Figure 22:
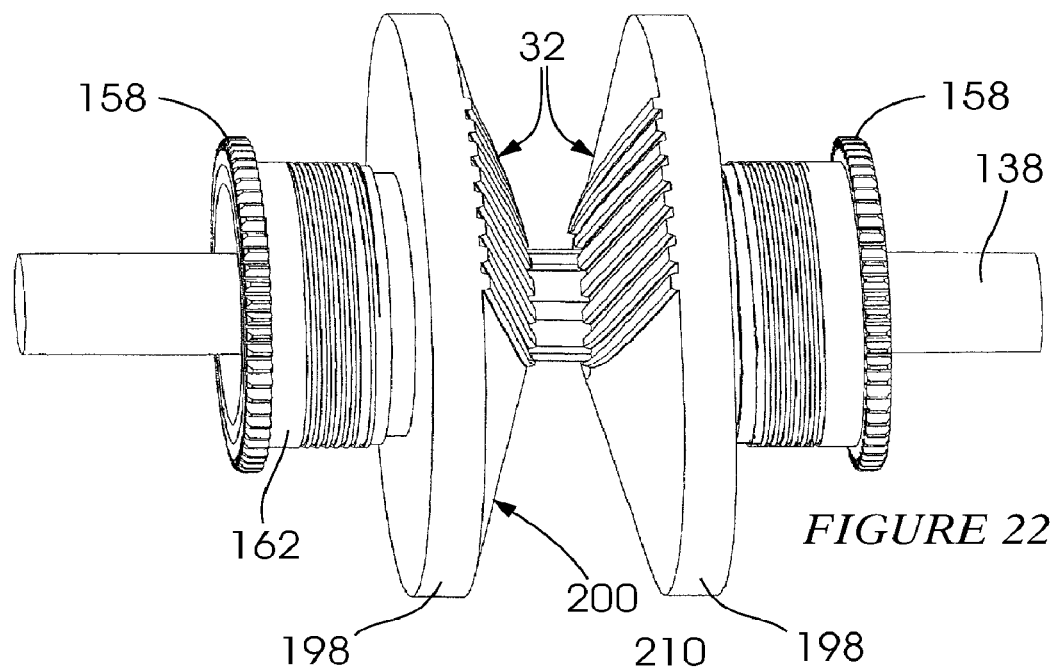
FIG. 22 is an isometric view of the ratio changing arrangement of a third embodiment of the machine of the invention.

The discs 198 each have a tapered face 200 and a series of ribs 202 which project outwardly from its face 200 to define between them grooves 204. As is seen in FIGS. 22 and 23, the side walls of the grooves 204 taper from their bases outwardly onto the outer surfaces of the ribs 202.

The free ends of the link pins 36 of the chain 34 of the previous machine embodiments carry, as shown in FIG. 24, heads 206 which are inwardly tapered towards the slightly coned outer faces 208 of the pins. The angle of taper of the sides of the pin heads 206 corresponds to the angle of taper of the side walls of the disc grooves 204 and their lengths to the depth of the grooves.

The ribs 202 and the grooves 204, in this embodiment of the invention, serve the purpose of the drive arrangements 32 and 140 of the previous embodiments. On rotation of the discs 198 the pin heads 206 of a portion of the circular chain 34 track between the discs are seated in and guided in ratio changing movement in the grooves 204, and in traversing the chain track throat 30, merely sequentially slip easily from the grooves 204 at the chain outlet from the throat with fresh pin heads again becoming seated in the leading groove of the series at the chain inlet to the throat 30 without colliding with the ribs 202.

The modified chain 34, however, results in large pin head 206 angles to enable the pin heads to smoothly engage the ribs 202 which may result in an unbalanced side force on the discs 198 in the ribbed section.

In high speed and high torque applications of this embodiment of the machine of the invention the grooves 204 in the discs 198 have the stepped cross-sectional shape shown in FIG. 25. The grooves 204 are divided into an outwardly tapered upper portion where the angle of taper of the side walls, when measured from a central plane through the groove, is significantly less than that of the grooves 204 in the FIG. 23 disc 184. The lower portions of the groove side walls are parallel sided and normal onto the groove base which is situated at the tapered surface level of the disc. The height of the ribs 202 and so the parallel side wall portions of the grooves 204 decrease very slightly from the large chain track radius at the periphery of the disc, as shown in FIG. 26, to that at the high ratio track position adjacent the machine output shaft aperture 210 as shown in FIG. 23.

The chain 212, shown in FIGS. 27 to 29, for use with the disc grooves 204 of FIG. 25 is substantially the same as the chain 34 of the previous embodiment except for its modified composite outer chain link arrangement 214.

The chain link arrangements 214 each consist of a portion of an inner link 216 which is fixed to the link pin 36 which carries it and an outer link 218. The outer link 218 is composed of two link portions $218^1$ and $218^{11}$ which, on the link pins 36, are held against relative rotation about the pin axes by the tongue and groove formations shown in the drawings. The link portions, are however, movable in the direction of the pin 36 axes relatively to one another.

The facing faces of the links 216 and 218 each carry a pair of fixed oppositely directed circular spiral ramps 220 which abut and ride on each other in use. The link portions $218^1$ and $218^{11}$ each include a fixed tapered head 222 having a base in which an end of a link pin 36 is rotatable and slidably movable. The link portions are lightly held on link pins by any suitable means such as an O-ring which is located in an external groove in the pins 36 and frictionally engage with the bores in the pin heads.

In use, with the chain 212 following a linear path the high end faces 224 of the pairs of ramps 220 are close together, as shown in FIG. 28. As the chain enters a curve, as in FIG. 29, the leading link pin will be moved from the FIG. 28 position to the FIG. 29 position to cause relative rotation between it and the pin trailing it. The same relative rotation occurs between the pairs of ramps 220 on the pins and the ramps on the links 218 will ride upwardly on those on the links 220 to cause coned ends 208 of the pins 36 to be less exposed from the pin heads 222. The pin length exposure between the small chain radius high ratio position of the chain track and its large radius low ratio positions between the discs 184 is illustrated in FIGS. 25 and 26 respectively. The degree of pin 36 exposure from the pin heads 222 is shown highly exaggerated in the drawings with the actual maximum degree of pin exposure in practice being varied by about 0.1 mm.

The modified chain enables the side walls of the grooves to have a lesser angle of taper than those of FIG. 23, as described above, to improve traction between the chain pin heads 222 and the tapered portion of the grooves 204 of FIG. 25 while also decreasing the actual force component of the interaction between the pin heads 222 and the side walls of the grooves to facilitate the entry and exit of the pin heads into and from the disc grooves 204.

Figure 30:
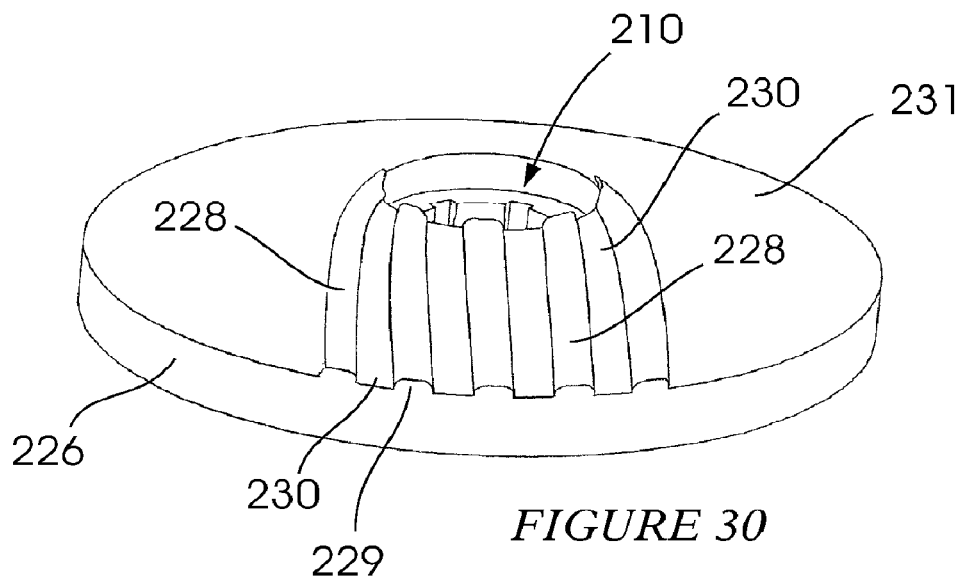
Figure 31:
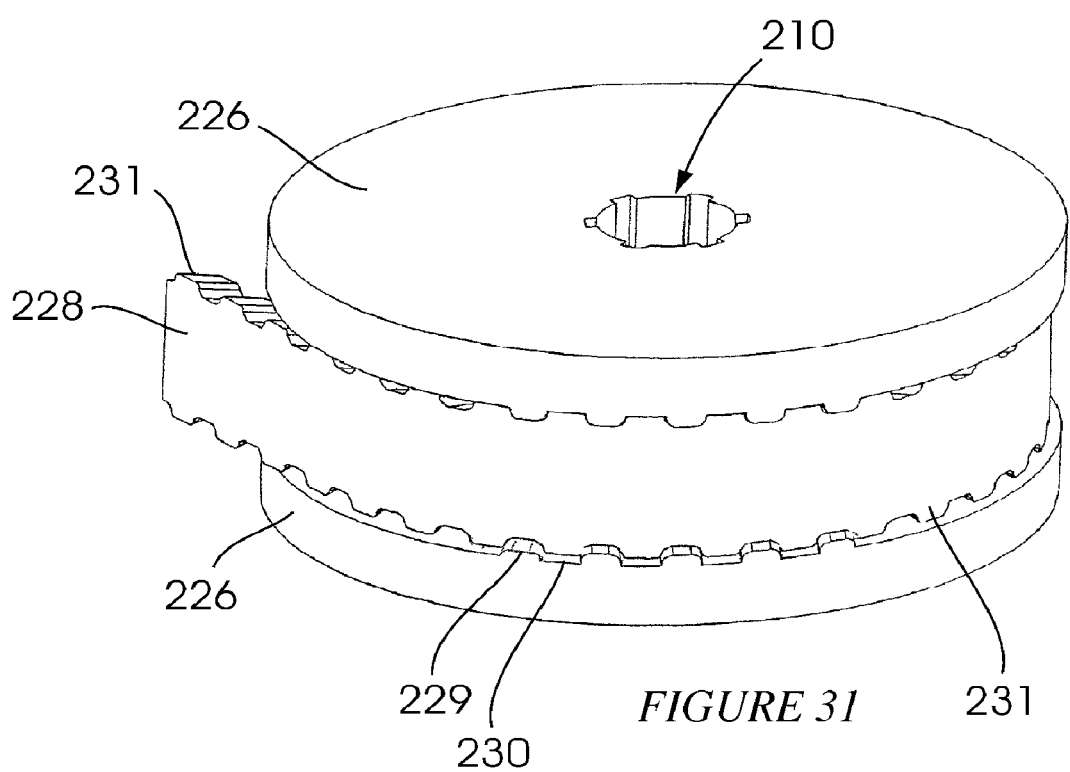
Figure 40:
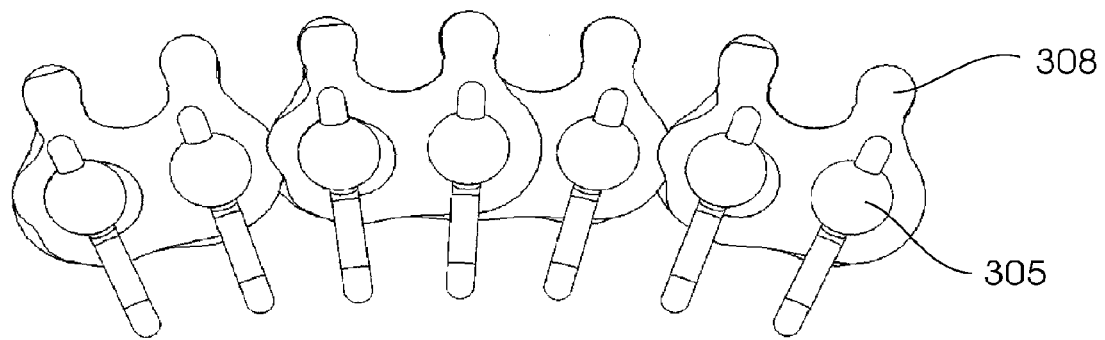
FIG. 40 is a side view and FIG. 41 is a perspective view of part of chain engagement structure with ratio changing, conical discs hidden.

In yet a further variation of the ratio changing discs, drive arrangement and chain of the FIG. 13 machine of the invention the discs 128 and chain 34 are replaced by the discs 226 and endless band 228 of FIGS. 30 and 31.

As is shown in FIG. 30 the discs 226 have a rib 229 and groove 230 drive arrangement on their tapered faces 231 which is similar to those of the discs 198 of FIGS. 22 and 23. The disc 226 grooves do not, however, include tapered side walls and are rounded onto the upper surfaces of the ribs.

The band 228 in this variation of the invention could be made from any suitable non-stretch flexible material but is preferably composed of a flat link metal or similar rigid material chain which is embedded in a suitably hard flexible material. The chain links may be suitably shaped to provide reinforcing for transversely directed teeth 231 which are complementally shaped to the disc grooves 230. Although not shown in FIG. 31 the belt 228 would obviously also need to be provided with sprocket holes to enable it to be engaged and guided by the throat 30 idler 26, drive 14 and tension sprocket or sprockets. Alternatively, the drive sprocket 14 of a machine including the discs 226 could be a flat faced pulley having side flanges which include ribbed radially directed teeth so that the pulley when engaged with the band 228 will have an appearance much like the disc arrangement of FIG. 31. The tension and idler sprockets 16 and 26 could merely be flanged flat face pulleys all of which make apertures in the band 228 unnecessary.

In this specification only the first embodiment of the IVT machine of the invention is described as having a disc balancing arrangement 68. The remaining embodiments will, however, also to a greater or lesser extent, require balancing which may be provided in any one of a number of ways known in the art of balancing rotating bodies.

FIGS. 32 to 34 illustrate the variables pertaining to the calculation, by means of the following mathematical model, the taper angles of the sides of the grooves 204 and ribs 202 of the ratio changing discs 198. The centrelines of the grooves 204 may be calculated using equations G and H above.

Points B, D, E, F and G all lie on the same drive radius SR (line AG) and are spread by angle θ with reference to point A (the centre of conical disc 198) which corresponds to chain link lengths L on drive radius SR, as shown in FIG. 32. With the X axis being the horizontal through point A and the Y axis being the vertical through point A the X, Y co-ordinates of points B, the groove centre point Xg, Yg, as an example can be calculated, given the drive radius SR and chain link length L, as follows:

$$L^2 = 2 \cdot SR^2 - 2 \cdot SR \cdot SR \cdot \cos(\theta) \text{ and by solving for } \theta \text{ results in:}$$

$$\theta = a\cos\left[1 - \frac{L^2}{2 \cdot SR^2}\right] \tag{I}$$

The X-Y co-ordinates of point B is thus as follows:

$$Xg: BC = SR \cdot \sin(k \cdot \theta) \tag{J}$$

$$Yg: AC = SR \cdot \cos(k \cdot \theta) \tag{K}$$

Where k indicates the whole number multiple indicating the chain link length number away from the Y axis, thus for example k=3 at point B. Combining equations I to K a generalised set of equations for X-Y co-ordinates can be derived as follows:

$$Xg = SR \cdot \sin\left(k \cdot a\cos\left[1 - \frac{L^2}{2 \cdot SR^2}\right]\right) \tag{L}$$

$$Yg = SR \cdot \cos\left(k \cdot a\cos\left[1 - \frac{L^2}{2 \cdot SR^2}\right]\right) \tag{M}$$

Where k indicates the whole number multiple indicating the chain link length number away from the Y axis, L the chain link length and SR the current drive radius. For the centre groove AG, obviously k=0.

The following provides a mathematical model for calculating the entry and exit angle φ of the pin into the grooves 204 of the conical disc 198 as the chain pin head 206 is engaging and disengaging the conical disc. The chain 34 circumference around the conical discs is calculated as the summation of all the chain link lengths L at drive radius SR around the conical discs, thus, the following relation between the straight length of chain LinDis leaving the conical disc and the corresponding rotation angle, β of the discs 198 can be written as follows:

$$LinDis = \frac{\beta \cdot L \cdot 360}{360 \cdot \theta} = \frac{\beta \cdot L}{\theta} \tag{N}$$

The above relates to the centre groove AM and can be extended to successive grooves 204 by only adding k·L where k is defined as above and as indicated on FIG. 33. Equation N thus results in the following:

$$LinDis = \frac{\beta \cdot L}{\theta} + k \cdot L \tag{O}$$

The new X,Y co-ordinates, Xn, Yn, of the groove 204 centre points, after rotation of discs 198 through angle β, as shown in FIG. 33, are calculated by performing a rotation around the Z axis on equations L and M as follows:

$$Xn = Xg \cdot \cos(\beta) + Yg \cdot \sin(\beta) \tag{P}$$

$$Yn = -Xg \cdot \cos(\beta) + Yg \cdot \cos(\beta) \tag{Q}$$

and by using equation L and M results in:

$$Xn = SR \cdot \sin\left(k \cdot a\cos\left[1 - \frac{L^2}{2 \cdot SR^2}\right]\right) \cdot \cos(\beta) + \\ SR \cdot \cos\left(k \cdot a\cos\left[1 - \frac{L^2}{2 \cdot SR^2}\right]\right) \cdot \sin(\beta) \tag{R}$$

$$Yn = -SR \cdot \sin\left(k \cdot a\cos\left[1 - \frac{L^2}{2 \cdot SR^2}\right]\right) \cdot \sin(\beta) + \\ SR \cdot \cos\left(k \cdot a\cos\left[1 - \frac{L^2}{2 \cdot SR^2}\right]\right) \cdot \cos(\beta) \tag{S}$$

The X,Y co-ordinates of the chain pin, Xp, Yp, when disengaging the discs 198, after rotation of conical disc through an angle β, are calculated as follows:

The X co-ordinate, Xp, is given by the length of chain that is not in contact with the conical disc 198 and is thus presented by LinDis in equation O. The Y co-ordinate is obviously equal to SR, thus:

$$Xp = \frac{\beta \cdot L}{\theta} + k \cdot L \quad \text{(T)}$$

$$Yp = SR \quad \text{(U)}$$

In order to find the Xn, Yn co-ordinates, along grooves 204 centre lines, that are the closest distance Dmin, to the pin co-ordinates (Xp,Yp), SR in equations R and S need to be varied, hereafter referred to as SRg, while SR in equations T and U is kept constant until the following equation reaches a minimum:

$$\text{Dmin} = [(Xn-Xp)^2 + (Yn-Yp)^2]^{0.5} \quad \text{(U)}$$

As an example FIGS. 33 and 34 indicate point H with co-ordinates (Xn, Yn) where k=2 and the corresponding chain pin head 206 position at N with co-ordinates (Xp, Yp) where N lies on the horizontal line MP a distance SR from the X axis with MN=LinDis+2*L.

Substitution into equation U results in:

$$\text{Dmin}^2 = \left[SRg \cdot \sin\left(k \cdot a\cos\left(1 - \frac{L^2}{2 \cdot SR^2}\right)\right) \cdot \cos(\beta) + SRg \cdot \cos\left(k \cdot a\cos\left(1 - \frac{L^2}{2 \cdot SR^2}\right)\right) \cdot \sin(\beta) - \left(\beta \cdot \frac{L}{a\cos\left(1 - \frac{L^2}{2 \cdot SR^2}\right)} + k \cdot L\right)\right]^2 + \quad \text{(V)}$$

$$\left[-\left(SRg \cdot \sin\left(k \cdot a\cos\left(1 - \frac{L^2}{2 \cdot SR^2}\right)\right)\right) \cdot \sin(\beta) + SRg \cdot \cos\left(k \cdot a\cos\left(1 - \frac{L^2}{2 \cdot SR^2}\right)\right) \cdot \cos(\beta) - SR\right]^2$$

Equation V can be differentiated with respect to SRg, set equal to zero and solved for SRg or Dmin can be iteratively calculated for different values of SRg until a minimum is found.

FIG. 34 presents the above variables as they are related to the disc face 200 at point J which is a point perpendicular to the X-Y plane below point H.

In order to calculate the entry angle φ, (the chamfer angle on the groove sides and taper angle on the chain pin heads 206) it is noted that for the minimum distance Dmin calculated with the above method, SRg will always be larger than SR since the chain is moving away from the conical disc (see FIGS. 33 and 35). Since the chain pins are in contact with the disc at radius from the spirit or scope of the invention as defined by the appended claims.

$$\text{DiskDis} = (SRg - SR) \cdot \tan(\alpha) \quad \text{(W)}$$

where α is the taper angle of the conical disc face.

Thus the entry of chamfer angle φ can be calculated as follows using equation W:

$$\tan(\phi) = \frac{\text{DiskDis}}{D\min} \quad \text{(X)}$$

$$\phi = a\tan\left[\frac{(SRg - SR) \cdot \tan(\alpha)}{D\min}\right]$$

The above calculations obviously need to be applied for values of DiskDis smaller than the depth of the disc grooves. It also needs to be repeated for all values of SR (all ratios of the incremental CVT) as well as for all values of k (all the grooves). The largest value of φ obtained in the above calculations needs to be applied to all the grooves and the mating chain pin heads 206.

Note that in order to account for the grooves on the negative X-axis the following can be done: Making X co-ordinate in equation L negative as well as changing equation T to $$Xp = \frac{\beta \cdot L}{\phi} - k \cdot L.$$

Also note that this equation will only be true for positive values of Xp, thus when the chain pin leave contact with the conical disc at Xp=0 or at the Y axis.

FIGS. 36 to 39 illustrate a variation of the first embodiment of the IVT machine of the invention as described with reference to FIGS. 1 to 12. In this variation of the invention the tapered ratio changing discs 20 of the ratio varying arrangement 18 are replaced by a single composite disc arrangement 232. Other than this the remaining components of the machine remain the same and carry the same reference numbers as in FIGS. 1 to 12. The operation of the two machines is substantially identical.

The composite disc arrangement 232 is shown in FIGS. 36 to 39 to include two superimposed discs 234 and 236. The disc 234, in this embodiment, carries six radially directed slots 238, and the composite output shaft 22, its tooth guide discs 78 and the drive arrangement 32 partial sprocket assembly of the first embodiment of the machine. The disc 234 is fixed to the coupled tooth guide discs 78. The disc 236 carries six arcuate slots 240 which are positioned on the disc relatively to the slots 238 in the disc 234 as shown in the drawings. The disc 236 is partially rotatable relatively to and against the disc 234.

The discs 234 and 236 are held together by heads 242 of double headed chain 34 support pins 244, shown in FIG. 39, which each pass through the slots 238 and 240 of the discs 234 and 236. The upper pin 244, in FIGS. 37 and 38 passes through and is fixed to the central tooth of the drive arrangement 32 partial sprocket to serve the same purpose as the pin 88 of the machine of the first embodiment.

In use, this variation of the machine operates in the same manner as that of FIGS. 3 to 12 with the only exception being that, instead of the machine controller causing the discs 20 to be moved towards and away from each other in ratio changing by means of the slotted arms on the frame element 28, the disc 236 is rotated relatively to the disc 234 by the controller activating any suitable mechanism for doing so.

The chain supporting pins 244 are shown in the low ratio position of the machine in FIGS. 36 to 38. To move the pins to the high ratio position of the machine the disc 236, as shown in FIG. 36 is rotated, relatively to the disc 234, in a clockwise direction to cause its arcuate grooves 240 to drive the pins radially inwardly in the disc 234 slots and to hold them in any selected ratio position on the composite disc 232. To move the pins back towards their low ratio positions on the disc 232 the disc 236 is merely rotated relatively to the disc 234 in an anticlockwise direction.

Figure 41:
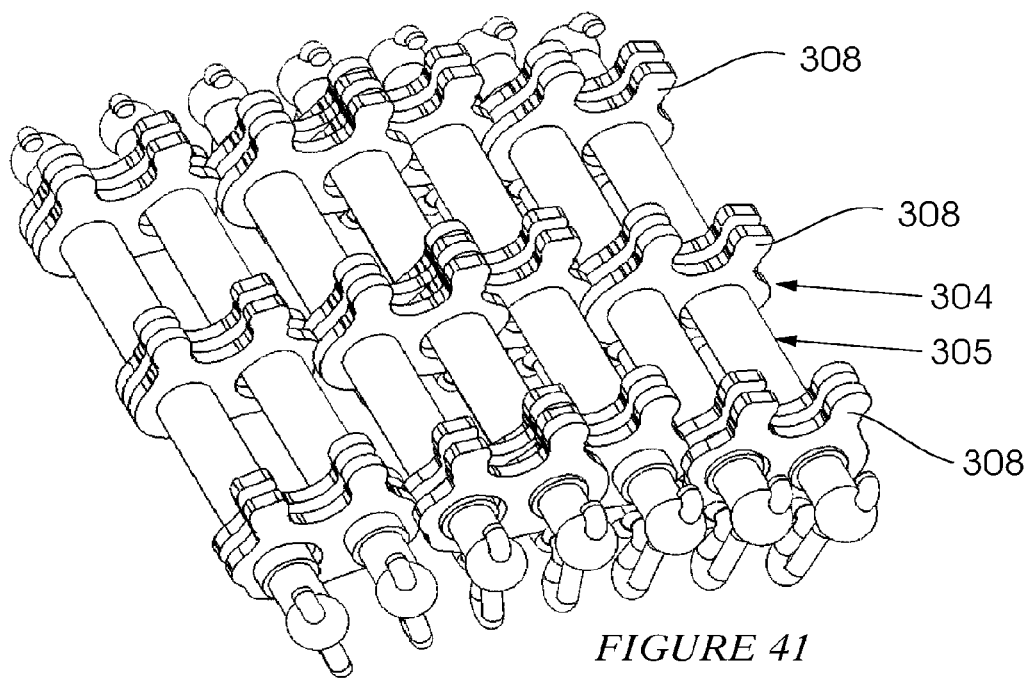
Figure 42:
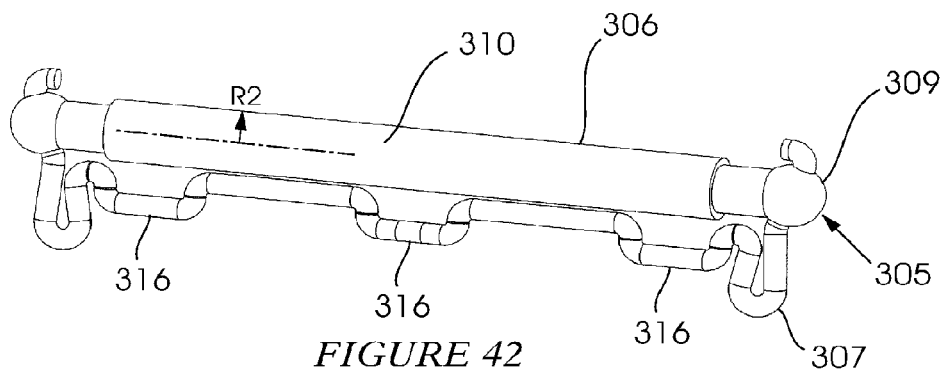
FIG. 42 is a perspective view of a drive bar.
Figure 43:
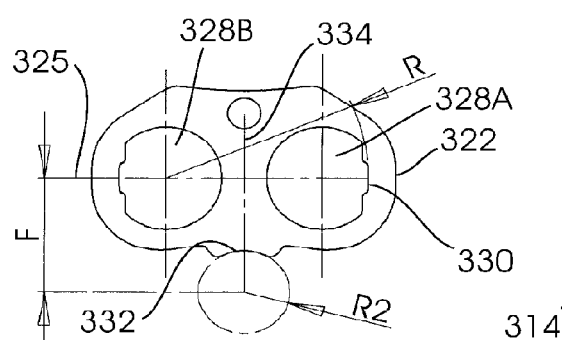
FIG. 43 is a side view of a chain link.
Figure 44:
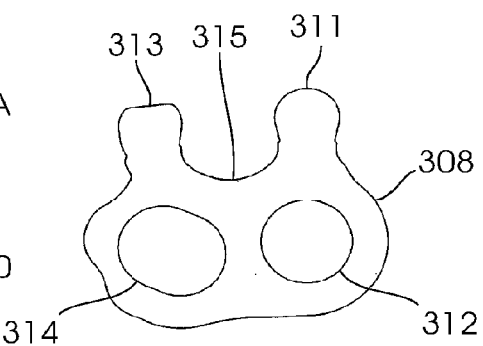
FIG. 44 is a side view of a driver plate.

FIGS. 41 and 42 are side and perspective views respectively of composite chain engagement structure 304 and FIGS. 42 to 45 illustrate various components of the structure.

The chain engagement structure 304 includes a plurality of drive bar units 305 and three composite arrays of driver plates 308. Each drive bar unit has a drive bar 306 and a profiled spring wire 307. Each drive bar has opposed spherical ends 309 and an enlarged centre section 310 which has the same diameter as the spherical ends 309. The radius of the centre section is marked R2 in FIG. 42. The spring wire 307 is attached to, and extends between, the spherical ends.

Each driver plate 308 (FIG. 44) includes a first projection 311 above a hole 312 and a second projection 313 above a slotted or oval hole 314 with a cut-out 315 between the projections 311 and 313.

The driver plates 308 are assembled in three arrays. Each driver plate is engaged with two adjacent drive bar units. The respective drive bars 306 are passed through the holes 312 and the slotted holes 314. Axial movement of the driver plates 308 is prevented by locating the plates in U-shaped formations 316 of the spring wires 307. This arrangement allows relative movement of the drive bars 306, via action in the slotted holes 314, as is explained hereinafter.

Figure 45A:
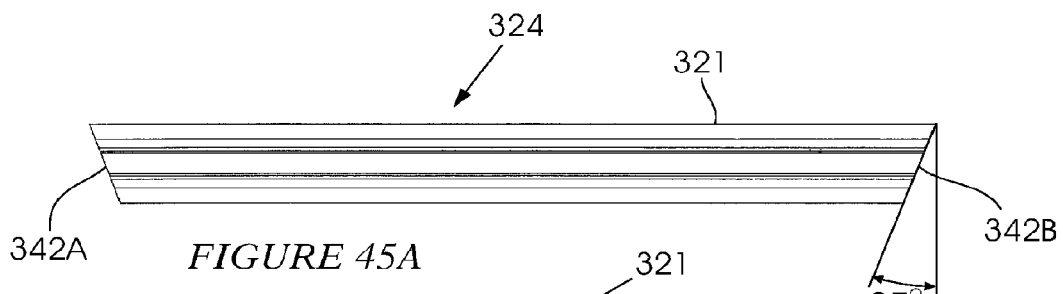
FIGS. 45A and 45B illustrate a chain pin from one side and in cross-section respectively.
Figure 45B:
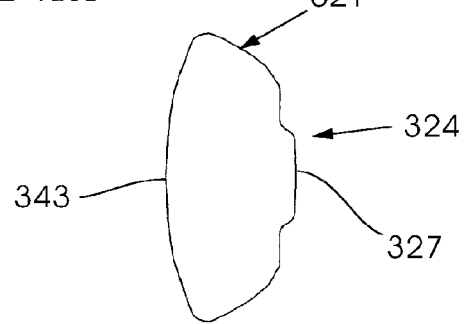
Figure 46A:
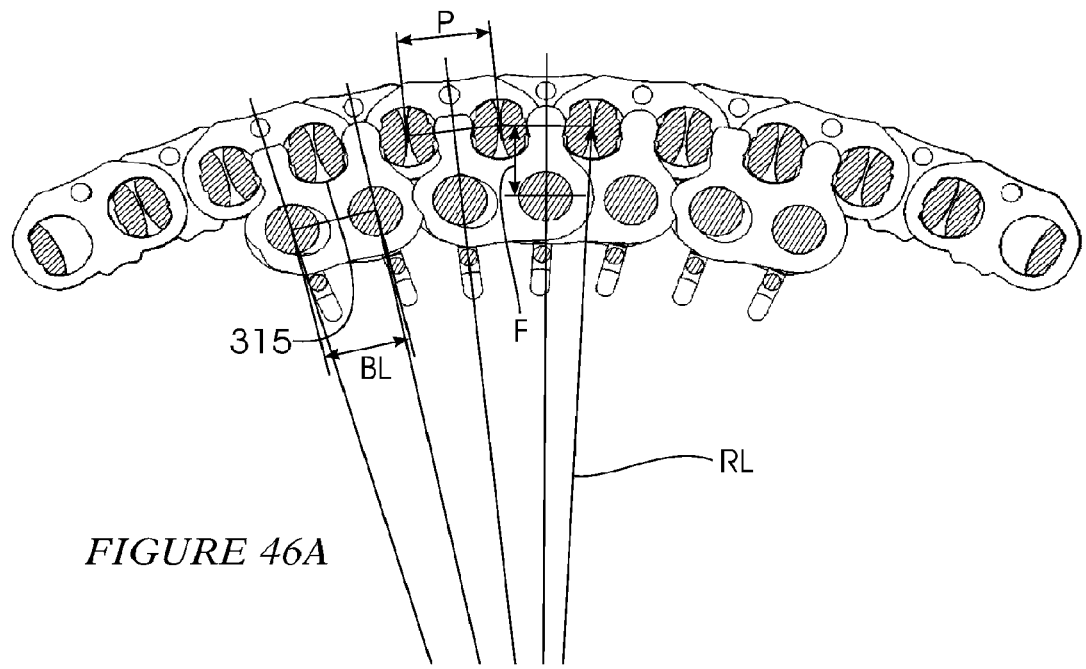
FIGS. 46A and 46B are side and perspective views respectively of a chain engaged with the chain engagement structure in a low ratio.
Figure 46B:
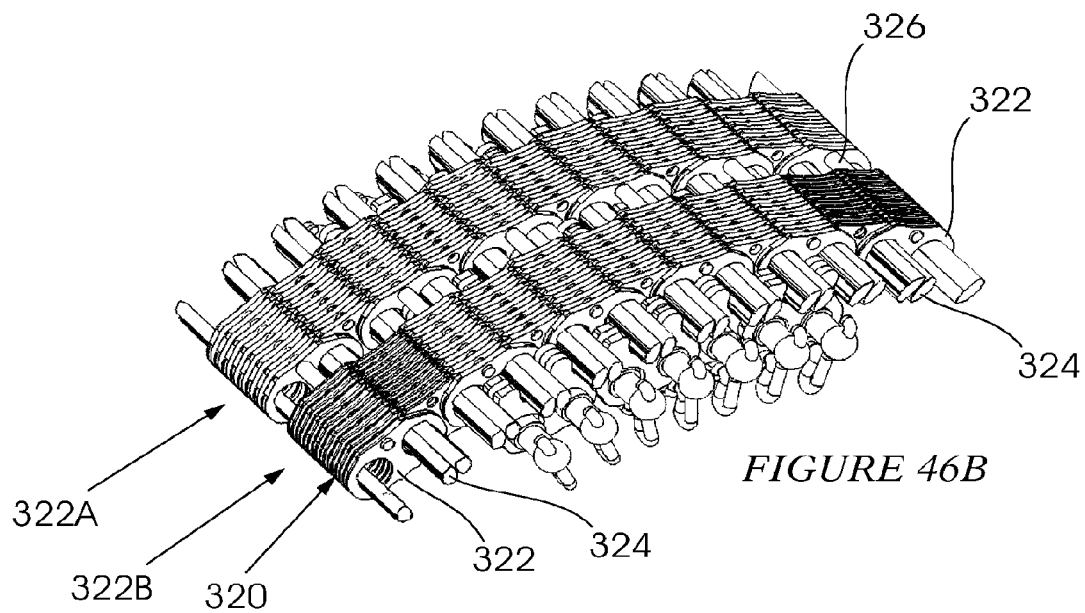

FIGS. 46A and 46B are side and perspective views respectively of part of a drive chain 320. The chain includes two spaced sets 322A and 322B of chain links 322 (FIG. 43), chain pins 324 (FIGS. 45A and 45B) and chain holding pins 326. Each chain holding pin has an increased dimension in a central region so that the sets 322A and 322B of the chain links are spaced apart.

Each chain link 322 has two spaced holes 328A and 328B respectively. The hole 328A has a partly circular cut-out 330 of radius R which is centred on the centre of the other hole 328B, and vice versa. A lower side of the chain link 322 has a partly circular cut-out 332 of radius R2 on a vertical centre line 334 of the link which is offset by a distance F from a horizontal centre line 336. The offset F is the same as the spacing F marked in FIG. 46A. The radius R2 is the same as that of the centre section 310 of each of the drive bars 306—see FIG. 42.

Each chain pin 324 (FIGS. 45A and 45B) includes an extrusion 321 with a partly circular surface 327 which is of complementary shape to the partly circular cut-out 330 of the chain link 322. Ends 342A and 342B of the extrusion are inclined to a longitudinal axis of the chain pin at an angle which is the same as the conical angle of the conical discs. This angle may be 27° as indicated in FIG. 45A. Chain pins 324 are of the rocker pin (silent chain) type pins, which operate in pairs while their involute surfaces 343 roll against each other during operation.

When the chain drive 320 is engaged with the chain engagement structure 304, lower surfaces of the chain pins can rest on the cut-outs 315 of the driver plates 308, and the cut-outs 332 of the chain links 322 can contact the centre sections 310 of the drive bars 306. Ends of the chain pins 324 abut respective inner faces of the opposed conical discs.

Figure 47A:
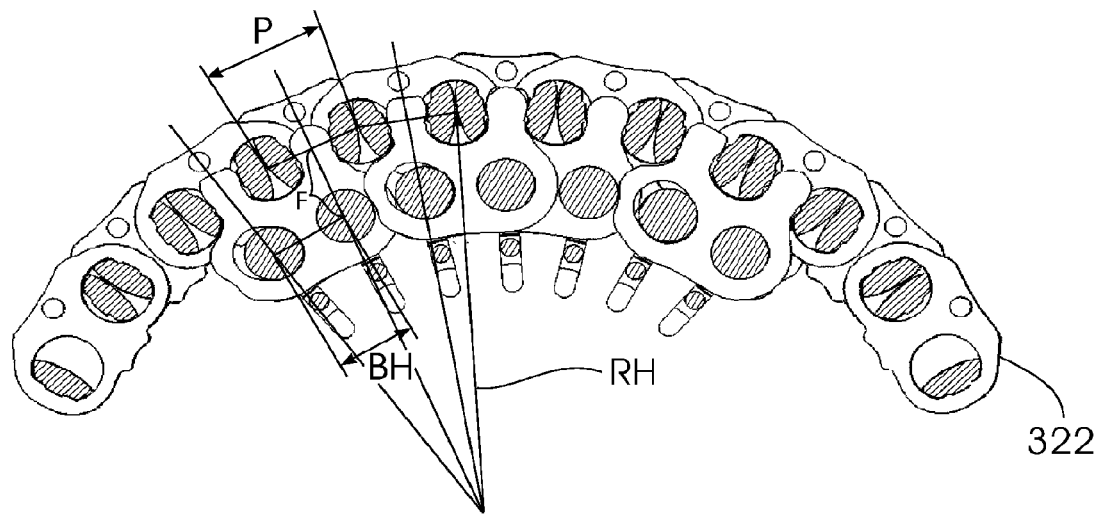
FIGS. 47A and 47B are side and perspective views respectively of the chain engaged with the chain engagement structure in a high ratio.
Figure 47B:
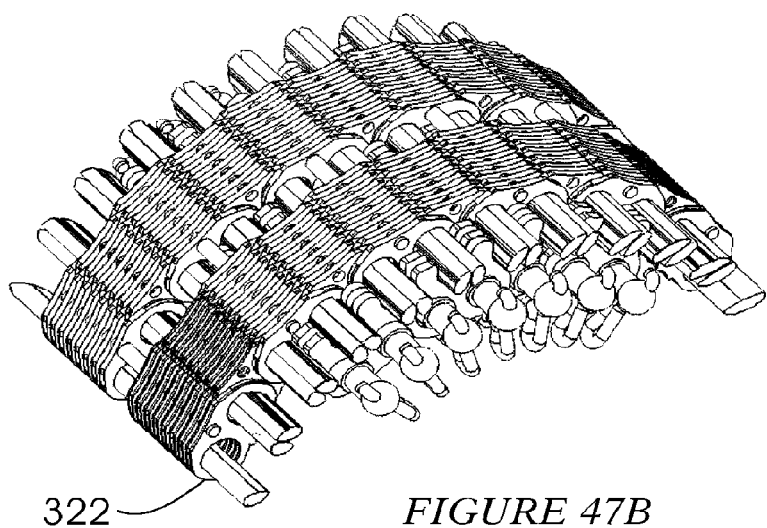
Figure 48A:
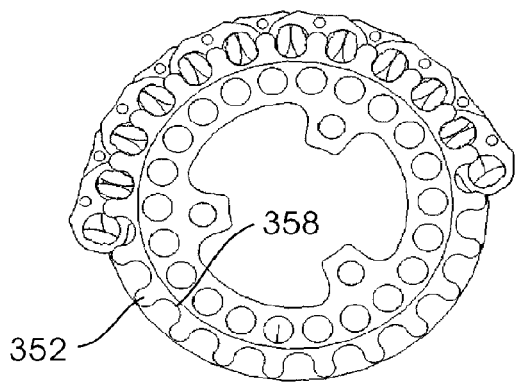
FIG. 48A is a side view of the chain engaged with a chain driver.
Figure 48B:
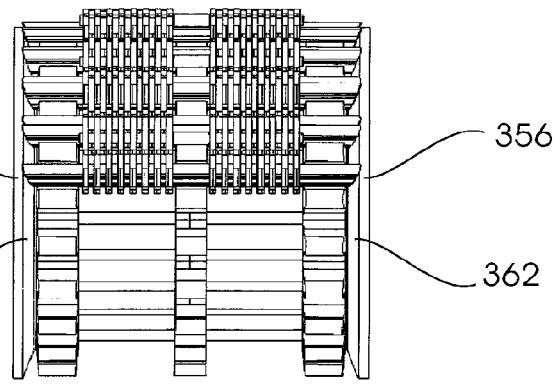
FIGS. 48B and 48C are end and perspective views respectively of the chain engaged with the chain driver.
Figure 48C:
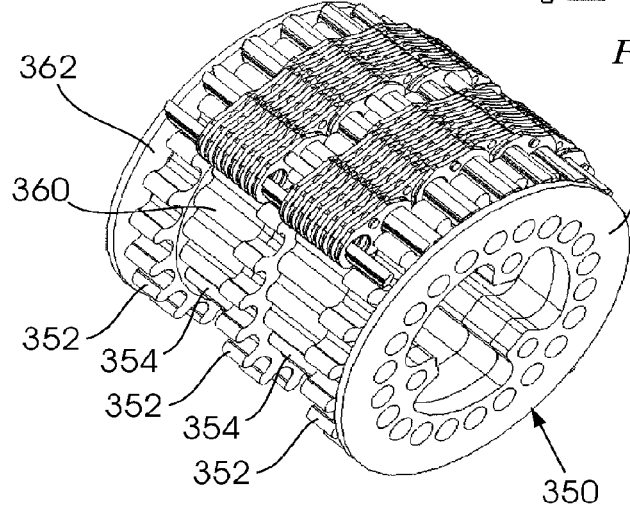
Figure 48D:
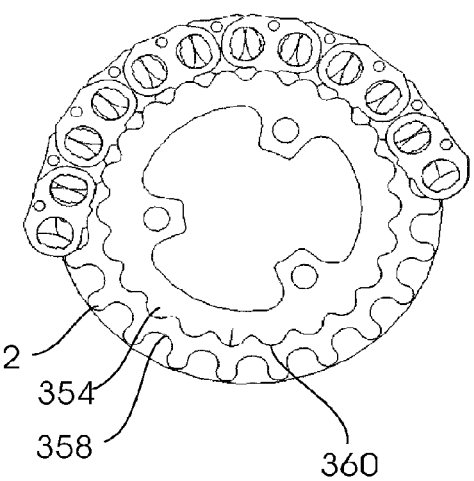
FIG. 48D is a view from one side in cross-section of the chain and chain driver taken on a line D-D in FIG. 48B.

During operation drive transfer between the drive chain 320 and the chain engagement structure 304 is accomplished by the engagement which is effected between the partly circular surface 327 of each chain pin 324 and the corresponding sides of the first and second projections 311 and 313 respectively, of the driver plates 308, as is shown in FIG. 46 (low ratio drive) and FIG. 47 (high ratio drive). In the low ratio drive the drive chain runs at a pitch radius of RL. In the high ratio drive the pitch radius is RH.

During operation of the machine, when a transition is made from the low ratio drive, shown in FIG. 46, to the high ratio drive, shown in FIG. 47, the pitch P of the drive chain 320 remains constant but the pitch between the drive bars changes from BL to BH. The reason for this is that the offset F remains constant but the ratios F/RL and F/RH vary. The slotted holes 314, in the driver plates 308, are provided to accommodate the change in pitch between BL and BH in the drive bars.

In order to achieve this action a precise geometrical configuration is required. The ends of drive bars 306 are shaped so that they can intimately engage with complemental ratio and drive transferring formations, similar to the lots in FIG. 14, in opposing inner surfaces of the conical discs. The spacing between adjacent pairs of these formations decreases, generally in a direction towards the axis of rotation of the discs i.e. the machine output shaft. Thus the spacing between adjacent drive bars 306 must be allowed to decrease in a corresponding manner as the drive ratio is increased. Also, the geometrical arrangement must also allow for a large number of relatively small incremental changes in the drive ratio with each increment being of a known and fixed amount.

If the belt (i.e. the chain) is at a first radial position relative to the axis of rotation of the discs and, as noted, ends of the relevant drive bars 306 are positively engaged with the associated complemental drive formations in the conical discs and the chain 320 is positively engaged with the chain engagement structure 304, then the angular displacement (AD) of two adjacent chain pins 324 relative to the axis of rotation of the discs, for a given distance RD from the axis of rotation, must be integrally divisible into 360° i.e. $(AD) \times N = 360°$ where N is a integer of variable size determined by a corresponding variation in AD. This relationship must be maintained as RD changes from RL to RH when the chain engagement structure 304 transitions across the throat 30. These factors also determine the size of each increment in the ratio as the ratio is changed. This relationship applies to all the embodiments in this specification.

If the aforementioned requirement is not met then smooth, synchronised and regular speed and drive transfer is not possible for the chain pins 324 would not have synchronised positive mechanical engagement with the chain engagement structure 304 when the chain engagement structure 304 transitions across the throat 30.(i.e. the chain pins 324 would jam against, or on top of, the formations 313 and 311)

The required constraint is met by appropriately generating the geometrical shapes and positions of the drive formations on the discs.

A driver 350 (FIGS. 48A to 48D) is used to drive the chain. The driver includes three chain pin drivers 352 which are spaced apart by two chain support wheels 354, and two outer pin guides 356.

The chain pin drivers 352 are engageable with the partly circular surfaces 327 of the chain pins, and transfer drive to the chain pins. Lower surfaces of the chain pins can rest in these cut-outs 358 in the chain pin drivers 352.

Each chain support wheel 354 includes partly circular formations 360 on its outer rim that can engage with complementary arcuate cut-outs 332 of the chain links during operation.

Each pin guide 356 includes a chamfer 362 on an inner side, angled at the same angle as ends of the pins 324. The chamfers serve to support the ends of the chain pins 324 and to align the chain pins 324 with the centre of the drive chain 320 during operation.

The inclusion of the chain support wheels 354 is not essential for they can be replaced with suitable spacers which are not in contact with the drive chain 320.

The foregoing embodiments are intended to be illustrative of the preferred embodiments of the invention. Those of ordinary skill may envisage certain additions, deletions or modifications to the foregoing embodiments which, although not specifically suggested herein, will not depart from the spirit or scope of the invention as defined by the appended claims.

The invention claimed is:

1. An Infinite Variable Transmission (IVT) machine comprising:
    an input shaft (12);
    a drive wheel (14) rotatable with the input shaft (12);
    an output shaft (22) rotatable about an output axis;
    a ratio changing device (20) having ratio changing formations (24), ratio changing device (20) mounted coaxially on and rotatably with, the output shaft (22);
    an endless belt (34) which passes over the drive wheel (14), the endless belt (34) having an open loop, and drive formations positively engaged with corresponding ones of the ratio changing formations (24) at respective locations at a distance RD from the output axis and angularly displaced from each other by a variable angle AD, relative to the output axis;
    a control means for causing the ratio changing formations (24) to vary a ratio of rotation of the input shaft (12) and the output shaft (22) by enlarging and reducing a loop dimension about an axis of the output shaft (22);
    a belt guide means (26) over which the belt (34) is movable, the belt guide means comprising two belt guide wheels (26) located in fixed close proximity to each other, and a space between the two belt guide wheels defining a throat (30) of fixed dimension through which the belt (34) enters and leaves the ratio changing device (20);
    a frame element (28) carrying both the belt guide wheels (26);
    a belt tensioning arrangement (16);
    a frame member (40) carrying the output shaft (22), the ratio changing device (20), the input shaft (12), the belt tensioning arrangement (16), and the frame element (28); and
    a drive arrangement (32), the drive arrangement (32) being
    (i) located on and rotatable with the ratio changing device (20) for the transmission of drive power to the output shaft (22),
    (ii) movable on the ratio changing device (20) towards and away from the output shaft (22),
    (iii) lockingly engaged with the belt (34) at a portion of the loop on the device (20), and
    (iv) engaged with the belt (34) at a portion of the circumference of the loop,
    wherein the loop on the ratio changing device (20) engages with the drive arrangement (32) in a path of travel through the throat (30) during operational rotation of the ratio changing device (20) to maintain optimal locking engagement with the belt (34) in all ratio positions of the loop on the ratio changing device (20),
    wherein the frame element (28) is configured
    (i) to carry both the belt guide wheels (26), and
    (ii) to be movable by the control means relative to the frame member (4) towards and away from the ratio changing device (20),
    wherein the control means is operable to vary the distance RD thereby to effect an incremental change, of defined magnitude, during one revolution of the output shaft (22), in the ratio of rotation of the input shaft (12) to the rotation of the output shaft (22), and
    wherein $(AD) \times N = 360°$, where N is a variable integer.

2. A machine according to claim 1, wherein, wherein the ratio changing device includes two frusto conical discs and wherein the ratio changing formations comprise slots in opposed faces of the discs, and the drive formations include drive bar units, movably engaged with respective slots, and driver plates which are linked to the drive bar units and which, at all times, are positively engaged with the belt in a synchronized manner.

3. A machine according to claim 2 wherein the belt is a rocker pin chain and includes chain pins, interconnected by chain links, which are positively engaged with the respective driver plates in a synchronized manner thereby to drive the drive plates.

4. A machine according to claim 2 wherein each driver plate includes a respective hole which is engaged with a respective drive bar unit and which is shaped to allow for a variation in pitch in the drive bar unit, during a ratio change, and to maintain the driver plate at a constant pitch for positive synchronized engagement with the belt.

* * * * *